(12) United States Patent  (10) Patent No.: US 9,177,239 B1
Stein  (45) Date of Patent: Nov. 3, 2015

(54) GENERATING MACHINE-READABLE OPTICAL CODES WITH AESTHETIC COMPONENT

(71) Applicant: Anki, Inc., San Francisco, CA (US)

(72) Inventor: Andrew Stein, San Francisco, CA (US)

(73) Assignee: Anki, Inc., San Francisco, CA (US)

( * ) Notice: Subject to any disclaimer, the term of this patent is extended or adjusted under 35 U.S.C. 154(b) by 0 days.

(21) Appl. No.: 14/682,480

(22) Filed: Apr. 9, 2015

Related U.S. Application Data

(60) Provisional application No. 61/978,113, filed on Apr. 10, 2014.

(51) Int. Cl.
 *G06K 7/12* (2006.01)
 *G06K 19/06* (2006.01)

(52) U.S. Cl.
 CPC ............ *G06K 19/06056* (2013.01); *G06K 7/12* (2013.01); *G06K 19/0614* (2013.01); *G06K 19/06037* (2013.01); *G06K 19/06103* (2013.01)

(58) Field of Classification Search
 USPC ............... 235/462.01, 462.04, 462.07–462.1, 235/469, 494, 462.08, 462.09
 See application file for complete search history.

(56) References Cited

U.S. PATENT DOCUMENTS

| | | | |
|---|---|---|---|
| 4,924,078 A | 5/1990 | Sant'Anselmo et al. | |
| 6,742,708 B2 | 6/2004 | Shaked et al. | |
| 6,886,863 B1 * | 5/2005 | Mowry et al. | 283/72 |
| 2002/0039387 A1 * | 4/2002 | Auvray et al. | 375/240.18 |
| 2002/0186884 A1 | 12/2002 | Shaked et al. | |
| 2004/0060990 A1 * | 4/2004 | Hilton et al. | 235/494 |
| 2005/0109846 A1 | 5/2005 | Lubow | |
| 2008/0130747 A1 * | 6/2008 | Moriya et al. | 375/240.15 |
| 2008/0170627 A1 * | 7/2008 | Yamada et al. | 375/240.24 |
| 2008/0197192 A1 * | 8/2008 | Lindahl et al. | 235/383 |
| 2009/0103803 A1 | 4/2009 | Kumar et al. | |
| 2010/0282851 A1 * | 11/2010 | Bulan et al. | 235/462.11 |
| 2011/0127331 A1 * | 6/2011 | Zhao et al. | 235/462.01 |
| 2012/0063676 A1 | 3/2012 | Kawabe et al. | |
| 2012/0069051 A1 * | 3/2012 | Hagbi et al. | 345/633 |
| 2013/0112760 A1 | 5/2013 | Schory et al. | |
| 2013/0146788 A1 * | 6/2013 | Yin et al. | 250/492.1 |
| 2013/0215473 A1 | 8/2013 | Fan et al. | |
| 2013/0286199 A1 | 10/2013 | Di Censo et al. | |
| 2014/0263666 A1 * | 9/2014 | Prince | 235/494 |
| 2014/0270517 A1 * | 9/2014 | Mesh-Iliescu et al. | 382/167 |
| 2014/0346231 A1 * | 11/2014 | Al-Omari et al. | 235/462.04 |

* cited by examiner

*Primary Examiner* — Tuyen K Vo
(74) *Attorney, Agent, or Firm* — Raubvogel Law Office

(57) ABSTRACT

Techniques are provided for generating machine-readable optical codes that have an aesthetic component that is integrated into the codes themselves. In this manner, the machine-readable optical codes can be designed to be aesthetically pleasing and/or can convey information to human viewers, and can even be disguised so that they do not appear to be machine-readable optical codes at all. Such information can be (but need not be) distinct from the information encoded for reading by a machine, even when the information is integrated into the code itself. The techniques described herein can be applied to any type of machine-readable optical code.

30 Claims, 24 Drawing Sheets

1701A

1701B

1701C

Kirk

GENERATING MACHINE-READABLE OPTICAL CODES WITH AESTHETIC COMPONENT

CROSS-REFERENCE TO RELATED APPLICATIONS

The present application claims priority from U.S. Provisional Application No. 61/978,113 for "Machine-Readable Optical Codes with Aesthetic Component", filed Apr. 10, 2014, the disclosure of which is incorporated herein by reference.

The present application is related to U.S. Utility application Ser. No. 14/682,483 for "Decoding Machine-Readable Optical Codes with Aesthetic Component", filed on the same date as the present application, the disclosure of which is incorporated herein by reference.

FIELD

The present description relates to machine-readable optical codes.

DESCRIPTION OF THE RELATED ART

Machine-readable optical codes are well known and ubiquitous. Such codes appear on documents, tickets, identification cards, products, display screens, tags, and in many other places, and can be used for many different purposes, such as identifying items, people, documents, objects, and/or the like. Examples of such codes are Quick Response (QR) codes and Universal Product Codes (UPCs). An imaging device is used to scan the optical code, and then relevant data is extracted from patterns within the code. Such data may include, for example, an index, pointer, or link to a resource (such as a database or website) containing additional information.

Referring now to FIG. 17, there are shown some examples of conventional machine-readable optical codes 1701A, 1701B, 1701C according to the prior art. In general, such codes are designed to be reliably read by machine, without regard to how they look to humans. However, since such codes often appear on product packaging, documents, and other locations where humans can see them, they can detract from the overall aesthetics of the object, packaging, document, or other surface where they appear. In addition, such machine-readable optical codes often occupy a significant portion of the available space that could otherwise be used for aesthetic purposes or for conveying information to a human. The latter issue is particularly problematic when machine-readable optical codes are placed on small objects or cards, which may afford little (if any) additional space for human-readable components outside of the area consumed by the machine-readable optical code. The machine-readable optical code can sometimes be made smaller, but usually this is at the cost of reduced readability and reliability. In general, however, existing machine-readable optical codes serve no function other than to be read by a machine.

In some cases, attempts are made to include human-readable text or graphics within some blank or empty area of the machine-readable optical code. For example, code 1701C includes text embedded within an empty area of the code. However, the area occupied by the text is not part of the code itself. Thus, in such arrangements, there is still a need for the machine-readable code to occupy significant space outside the human-readable elements.

SUMMARY

According to various embodiments, techniques are provided for generating machine-readable optical codes that have an aesthetic component that is integrated into the codes themselves, and that occupies the same space as the codes themselves. In this manner, the machine-readable optical codes themselves can be designed to be aesthetically pleasing and/or can convey information to human viewers, and can even be disguised so that they do not appear to be machine-readable optical codes at all. Such information can be (but need not be) distinct from the information encoded for reading by a machine, even when the information is integrated into the code itself.

In at least one embodiment, optical codes are constructed by taking advantage of the negative space that exists within the machine-readable optical code but is normally not used in decoding the code. Specifically, each region, or "cell" of the machine-readable optical code occupies a certain area; however, only a portion of that area, referred to as a "probe location", is normally read by the machine when decoding the code. The remaining area of the cell (outside the probe location) is normally ignored by the machine, and can therefore be assigned any arbitrary color so as to suit the overall aesthetic scheme. In at least one embodiment, the probe location is relatively small compared to the size of each cell, thus allowing considerable freedom in creating an overall aesthetic design that is consistent with the desired information to be conveyed via the probe locations.

For example, in one embodiment, each cell is a square, and each probe location is a circle having a diameter that is ⅓ the width of its corresponding cell. In such an embodiment, the area outside the probe location occupies approximately 91.3% of the total area of the cell, and this 91.3% can be assigned to any arbitrary color to suit an overall aesthetic scheme.

The techniques described herein can be applied to any type of machine-readable optical code, such as for example QR codes, bar codes, Universal Product Codes (UPCs), or the like. One skilled in the art will recognize that this list of examples is not exhaustive.

Further details and variations are described herein.

BRIEF DESCRIPTION OF THE DRAWINGS

The accompanying drawings illustrate several embodiments. Together with the description, they serve to explain the principles of the system and method according to the embodiments. One skilled in the art will recognize that the particular embodiments illustrated in the drawings are merely exemplary, and are not intended to limit scope.

DETAILED DESCRIPTION OF THE EMBODIMENTS

According to various embodiments, the system and method described herein are able to generate machine-readable optical codes that are aesthetically-pleasing, flexible, and/or contain additional meaning when read by humans. The techniques described herein take advantage of negative space in the machine-readable optical code, referring to those areas that are part of the code but are not read by a scanning device; such areas can be used to provide aesthetic improvements to the code without affecting its value as read by a machine. In various embodiments, the techniques described herein can support any resolution/complexity of codes (including any number of encoded bits or cells), as well as a fully-parameterized, scale-independent fiducial shape and code pattern.

As discussed below, some embodiments allow for dynamic adjustment of the decoding pattern and/or resolution at decode time.

The techniques described herein also provide for efficient, robust detection and decoding. Robust binarization can use a local scale to dynamically determine a spatially-varying threshold. As discussed below, a progressive cascade of increasingly complex filters can be used to remove candidates.

In addition, various embodiments provide for perspective warping of probe locations to handle wide range of viewing angles, and/or sub-pixel refinement for accurate probe placement.

In at least one embodiment, if a known physical size is associated with an observed code and the camera's intrinsic calibration is available, the camera's 3D pose can be determined (i.e., rotation and translation) with respect to the code's fiducial (or, equivalently, the code's pose with respect to the camera).

According to various embodiments, the system and method described herein can be implemented in connection with any system for creating and/or reading machine-readable optical codes. Such codes may be associated with any product, document, object, item, device, or the like. The codes may be stored, transmitted, and/or output according to any known technique or technology, including for example being printed on a tag, label, or document, displayed on a screen, or the like. The codes may be of any suitable size, shape, or dimension, and output in any suitable color or combination of colors.

Although the system is described herein in connection with particular layouts and arrangements of machine-readable optical codes, one skilled in the art will recognize that such examples are merely intended to be illustrative, and that the techniques described herein can be implemented in other contexts, and indeed in any context where a machine-readable optical code is being generated or read. Although some examples of these other contexts are described below, such descriptions are not intended to be limiting. Accordingly, the following description is intended to illustrate various embodiments by way of example, rather than to limit scope.

Figure 1:
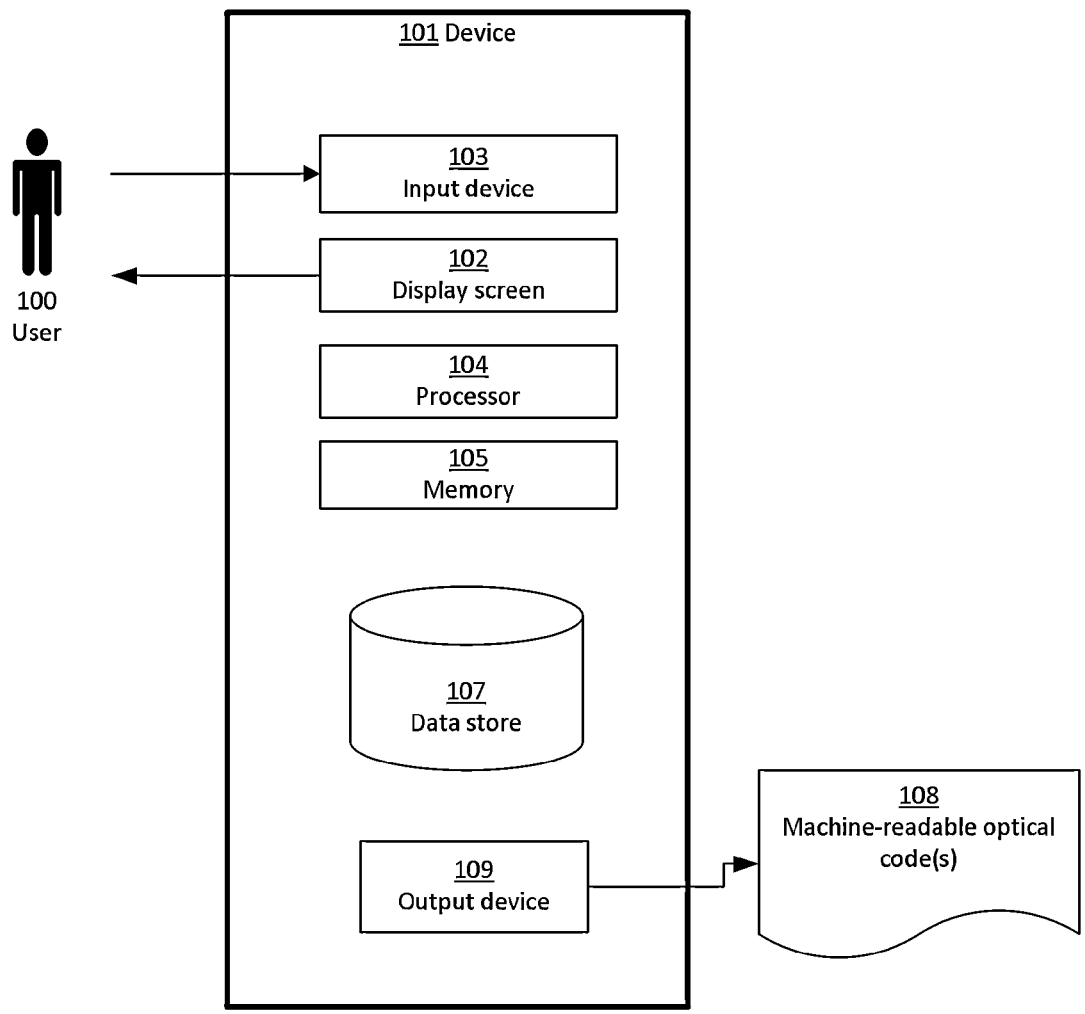
FIG. 1 is a block diagram depicting a hardware architecture for generating a machine-readable optical code having an aesthetic component, according to one embodiment.

Referring now to FIG. 1, there is shown a block diagram depicting a hardware architecture for generating a machine-readable optical code having an aesthetic component, according to one embodiment. Such an architecture can be used, for example, for implementing the techniques described herein in a computing device or other electronic device 101 configured to generate output in the form of one or more machine-readable optical code(s) 108.

In at least one embodiment, device 101 has a number of hardware components well known to those skilled in the art. Display screen 102 can be any element that displays information, which can include, for example, machine-readable optical code(s) 108 and user interface controls for designing and generating such code(s) 108. Input device 103 can be any element that receives input from user 100, such as for example a touchscreen, keyboard, mouse, dial, wheel, button, trackball, stylus, or the like, or any combination thereof. Input device 103 can also receive speech input or any other form of input. Input received via input device 103 can be used in generating code(s) 108.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 107 can be any magnetic, optical, or electronic storage device for data in digital form; examples include flash memory, magnetic hard drive, CD-ROM, or the like. Data store 107 can be used for storing machine-readable optical code(s) 108, either temporarily or permanently, and can also be used for storing other information used in generating machine-readable optical code(s) 108.

Device 101 can also include output device 109, for outputting or transmitting machine-readable optical code(s) 108. Such output device 109 can be integrated into device 101, or can be a separate component such as a printer. Any suitable mechanism can be used for storing, transmitting, and/or outputting code(s) 108.

The system can also be implemented in a client/server environment or distributed computing environment. In such environments, any or all of the components shown in FIG. 1 can be implemented in different computing devices that communicate with one another over a network such as the Internet. Known protocols are used for implementing such interaction among components. Any suitable type of communications network, such as the Internet, can be used as the mechanism for transmitting data among the various components. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, components of the system can include network communications interfaces for enabling communication with other components via the electronic network. Other architectures are also possible.

In at least one embodiment, such a system can be implemented in a web-based context, wherein user 100 controls operation of the system via a web browser that interacts with web pages provided by a web server.

Figure 2:
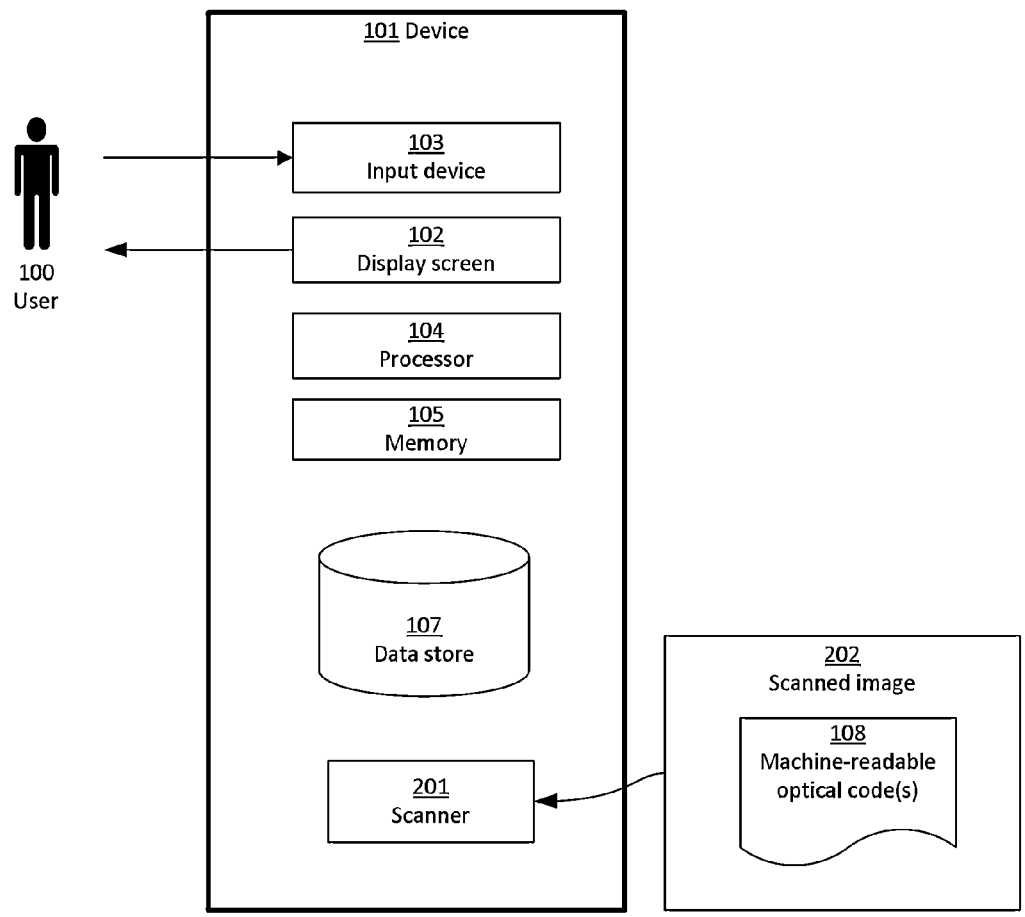
FIG. 2 is a block diagram depicting a hardware architecture for reading and processing a machine-readable optical code having an aesthetic component, according to one embodiment.

Referring now to FIG. 2, there is shown a block diagram depicting a hardware architecture for reading and processing a machine-readable optical code having an aesthetic component, according to one embodiment. Such an architecture can be used, for example, for capturing or scanning an image 202 containing machine-readable optical code(s) 108 as may be generated using the techniques described herein. Device 101 of FIG. 2 may be same device 101 as depicted in FIG. 1, or it may be a different device.

In at least one embodiment, device 101 has a number of hardware components well known to those skilled in the art. Display screen 102 can be any element that displays information, which can include, for example, machine-readable optical code(s) 108 and user interface controls. Input device 103 can be any element that receives input from user 100, such as for example a touchscreen, keyboard, mouse, dial, wheel, button, trackball, stylus, or the like, or any combination thereof. Input device 103 can also receive speech input or any other form of input.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 107 can be any magnetic, optical, or electronic storage device for data in digital form; examples include flash memory, magnetic hard drive, CD-ROM, or the like. Data store 107 can be used, for example, for storing data extracted from machine-readable optical code(s) 108, either temporarily or permanently, and can also be used for storing other information.

Device 101 can also include scanner 201 or any other image capture device, for capturing or scanning image 202 containing code(s) 108. Processor 104 may perform operations for extracting and interpreting code(s) 108 found in image 202. Additional details on such extraction and interpretation operations are provided below. Scanner 202 can be integrated into device 101, or can be a separate component.

The architecture depicted in FIG. 2 is merely exemplary. The system can also be implemented many other architectures, including for example a client/server environment or distributed computing environment.

In one embodiment, the system can be implemented as software written in any suitable computer programming language, whether in a standalone or client/server architecture. Alternatively, it may be implemented and/or embedded in hardware.

Figure 3:
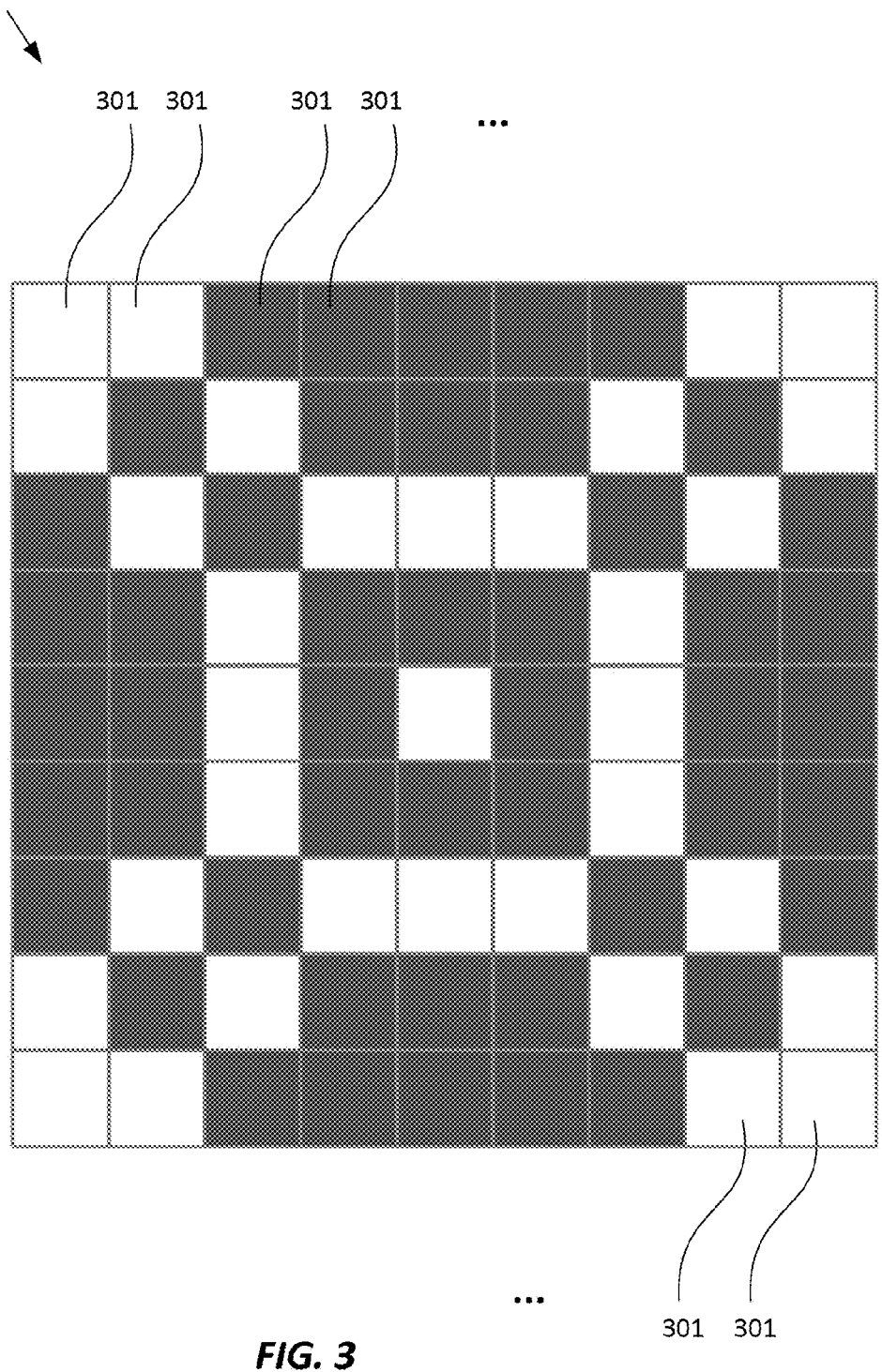
FIG. 3 depicts an example of the style of a conventional machine-readable optical code, which exhibits a blocky aesthetic, according to the prior art.

Referring now to FIG. 3, there is shown an example of the style of a conventional machine-readable optical code 108A, which exhibits a blocky aesthetic, according to the prior art. The optical code contains 81 cells 301 in a 9×9 grid. The grid would not normally be shown as part of code 108 in normal use; it is included in FIG. 3 to more clearly indicate cells 301.

In conventional encoding schemes such as the one depicted in FIG. 3, each cell 301 is entirely filled with one color: either black or white, for example.

Figure 4:
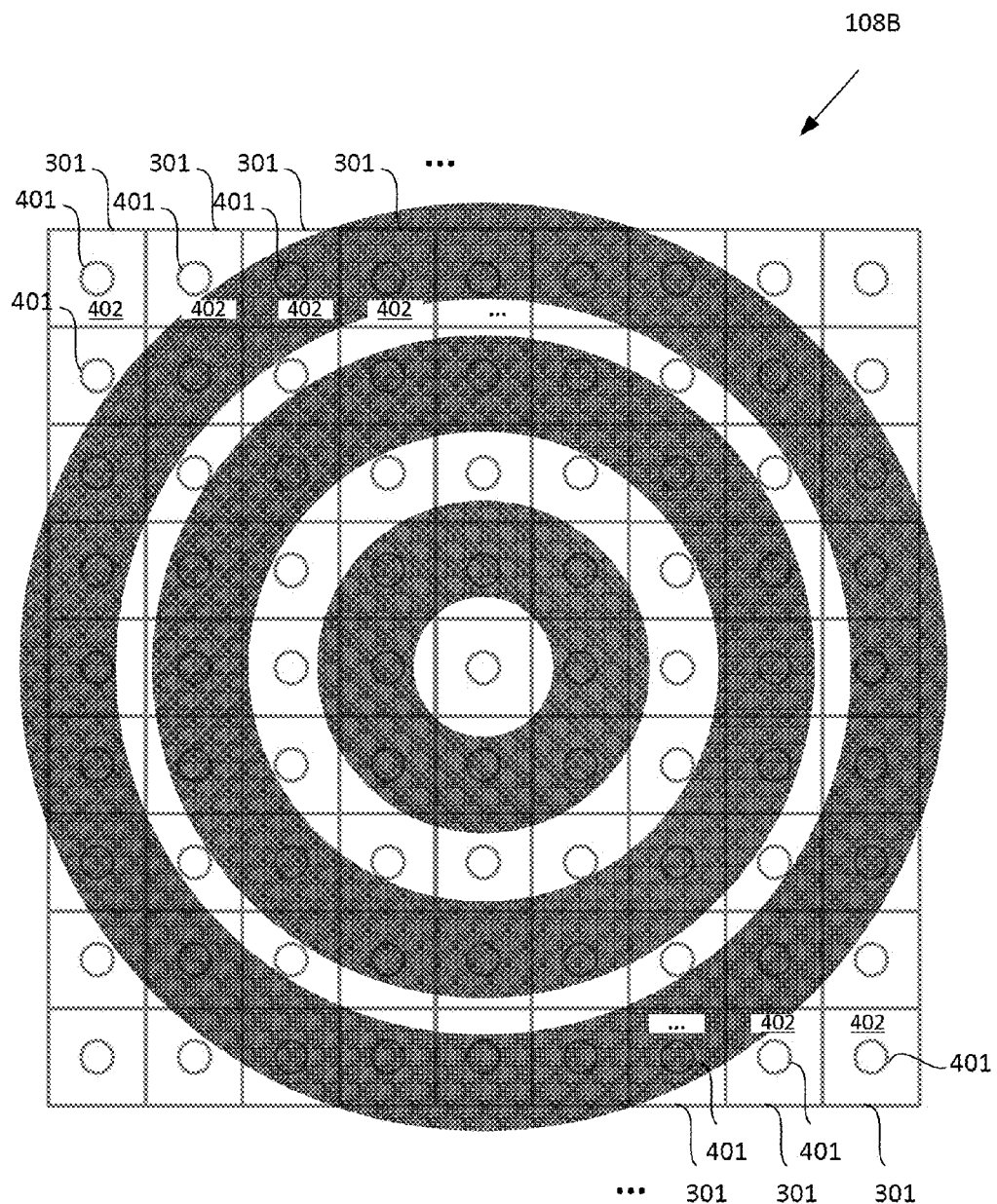
FIG. 4 depicts an illustrative example of a machine-readable optical code having an aesthetic component and containing the same information as in FIG. 3, according to one embodiment.

By contrast, the techniques described herein use probe locations occupying only a portion of each cell 301. Referring now to FIG. 4, there is shown an illustrative example of a machine-readable optical code 108B having an aesthetic component and containing the same information as code 108A depicted in FIG. 3, according to one embodiment. In FIG. 4, probe locations 401 are indicated at the center of each 301. These probe locations 401 represent the area within each cell 301 where a machine sensor will attempt to detect the color of the cell 301. The negative space 402 (the portion of each cell 301 not within the probe location 401) is ignored by the machine sensor and can be used to construct an aesthetically pleasing, artistic, and/or otherwise meaningful design. Probe locations 401 are shown as circular in FIG. 4, although they can be of any shape. They are shown as being centered within their respective cells 301; although this may generally be the preferred arrangement, other arrangements are possible.

To a machine sensor, code 108A of FIG. 3 and code 108B of FIG. 4 represent the same information, since the same probe locations 401 are shaded in each. However, code 108B is presented as an aesthetically pleasing pattern of concentric circles not possible with the conventional approach.

The techniques described herein can be used to include any suitable design in a machine-readable optical code 108, as long as the design is compatible with the specific values needed for probe locations 401. Of course, the greater the proportion of negative space 402 (i.e., the smaller each probe location 401 as compared with its corresponding cell 301), the more flexibility is afforded to generate an aesthetically pleasing design. In addition, the smaller the probe locations 401, the more precision is needed in reading code 108 and/or finding probe locations 401.

In various embodiments, the design for code 108 need not be aesthetically pleasing, but can carry any suitable meaning, branding value, directions, and/or the like, when viewed by a human. The techniques described herein provide considerable flexibility in generating codes 108 containing any such information. The human-readable design or information can be a different representation of the same information as encoded in the machine-readable optical code (or some portion thereof), or it can be entirely different. For example, the human-readable design may be an icon or corporate logo, while the machine-readable optical code may be a pointer to a database with specific product and pricing information.

It should be noted that in FIGS. 3 and 4, as well as in the other examples provided herein, cells 301 and probe locations 401 are depicted for illustrative purposes only. In general, such cells 301 and probe locations 401 would not be shown in actual machine-readable optical codes 108 generated according to the techniques described herein. Rather, such cells 301 and probe locations 401 are depicted herein to show the relationship between the designs generated according to the techniques described herein and the areas that are used when reading codes 108 by a machine.

Furthermore, for clarity of description, the examples provided herein depict optical codes having a number of cells 301, wherein each cell 301 is either "on" or "off"; these states can be represented by two different colors such as, for example, black and white. However, one skilled in the art will recognize that any suitable colors (or other visually distinctive attributes) can be used to represent the "on" and "off" states. Additionally, in alternative embodiments, more than two states can be available for each cell 301: for example, each cell 301 can have one of three, or four, or any number of different colors (or other visually distinctive attributes).

Figure 5:
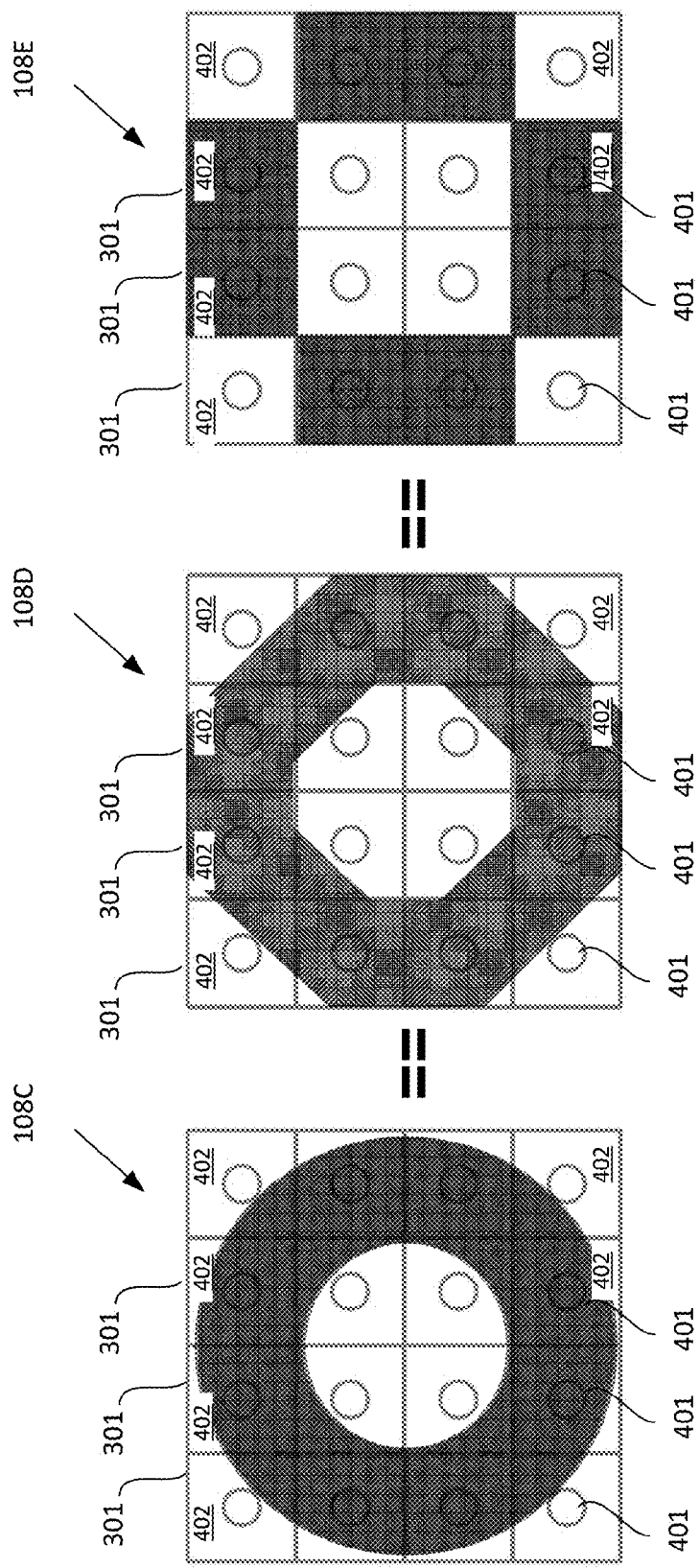
FIG. 5 depicts an illustrative example of three machine-readable optical codes containing the same information but different aesthetic appearances, according to one embodiment.

Referring now to FIG. 5, there is shown an illustrative example of three machine-readable optical codes 108C, 108D, 108E, generated according to one embodiment and containing the same information but different aesthetic appearances. In all three cases, coloring at probe locations 401 is identical, so that the three codes 108 carry the same meaning when read by a machine. However, negative space 402 is used to generate different designs having different aesthetic characteristics.

Figure 6:
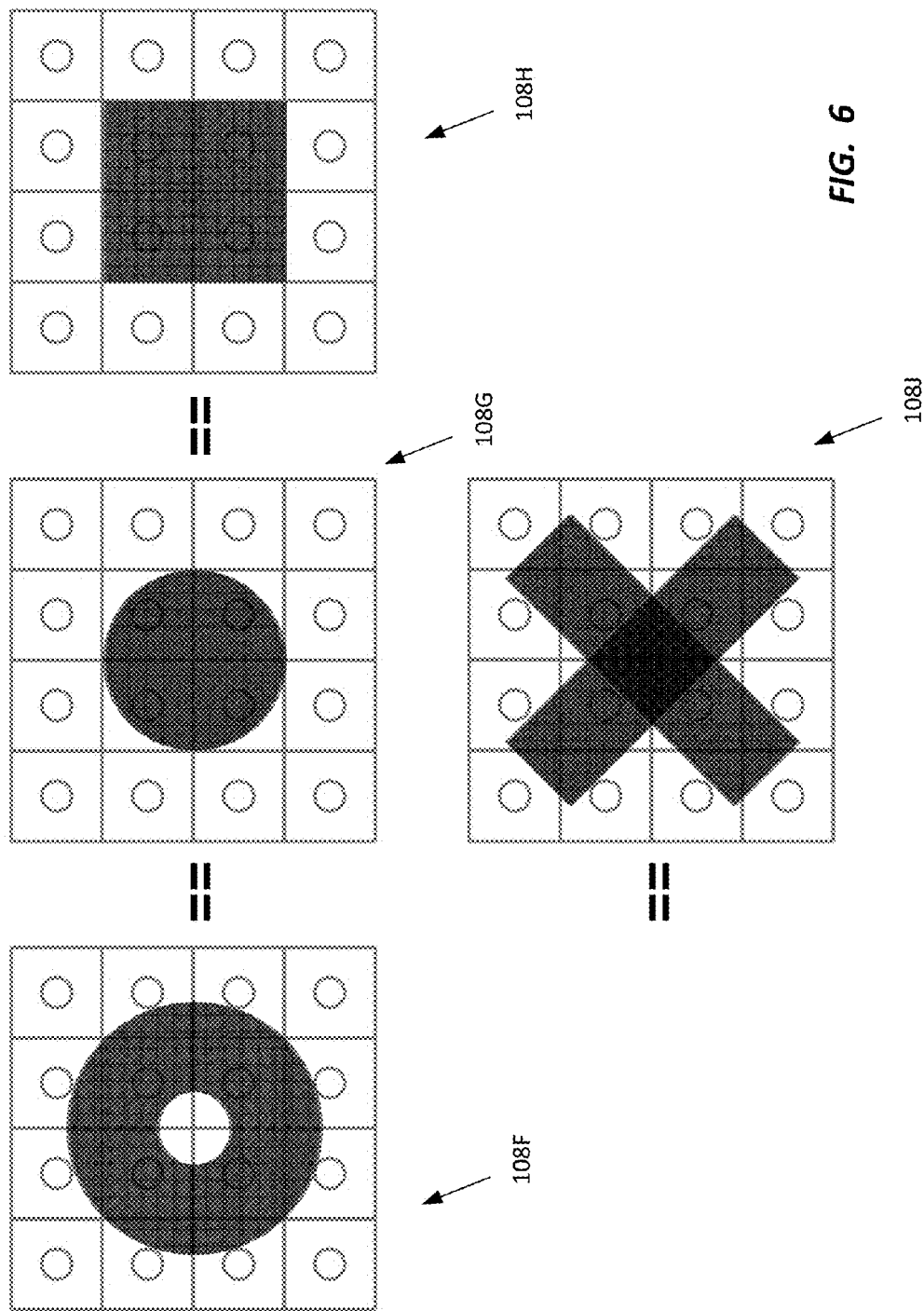
FIG. 6 depicts another illustrative example of four machine-readable optical codes containing the same information but different aesthetic appearances, according to one embodiment.

Referring now to FIG. 6, there is shown another illustrative example of four machine-readable optical codes 108F, 108G, 108H, 108J, containing the same information but different aesthetic appearances, according to one embodiment.

Figure 7A:
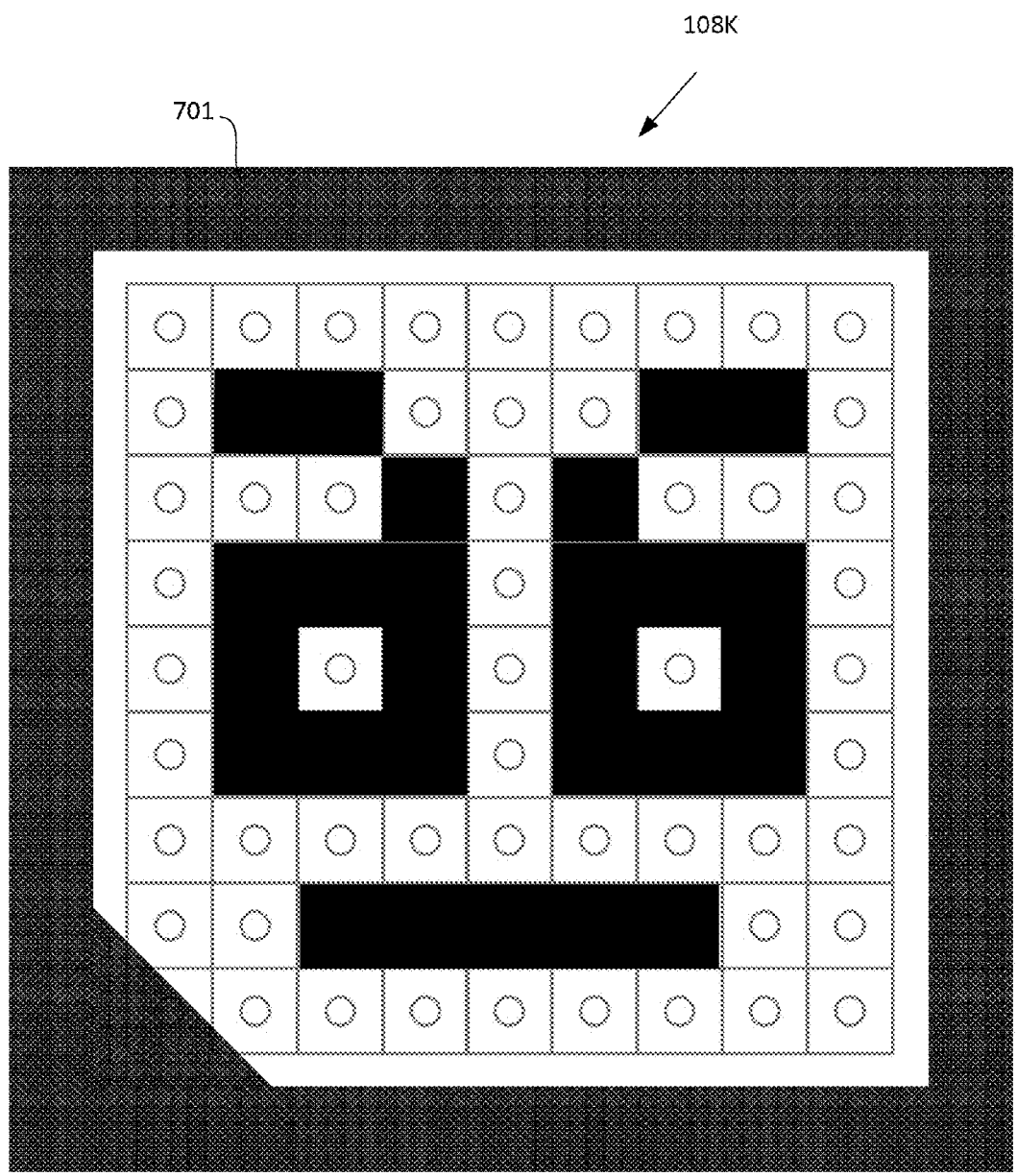
FIGS. 7A and 7B depict another illustrative example of two machine-readable optical codes containing the same information but different aesthetic appearances, according to one embodiment.
Figure 7B:
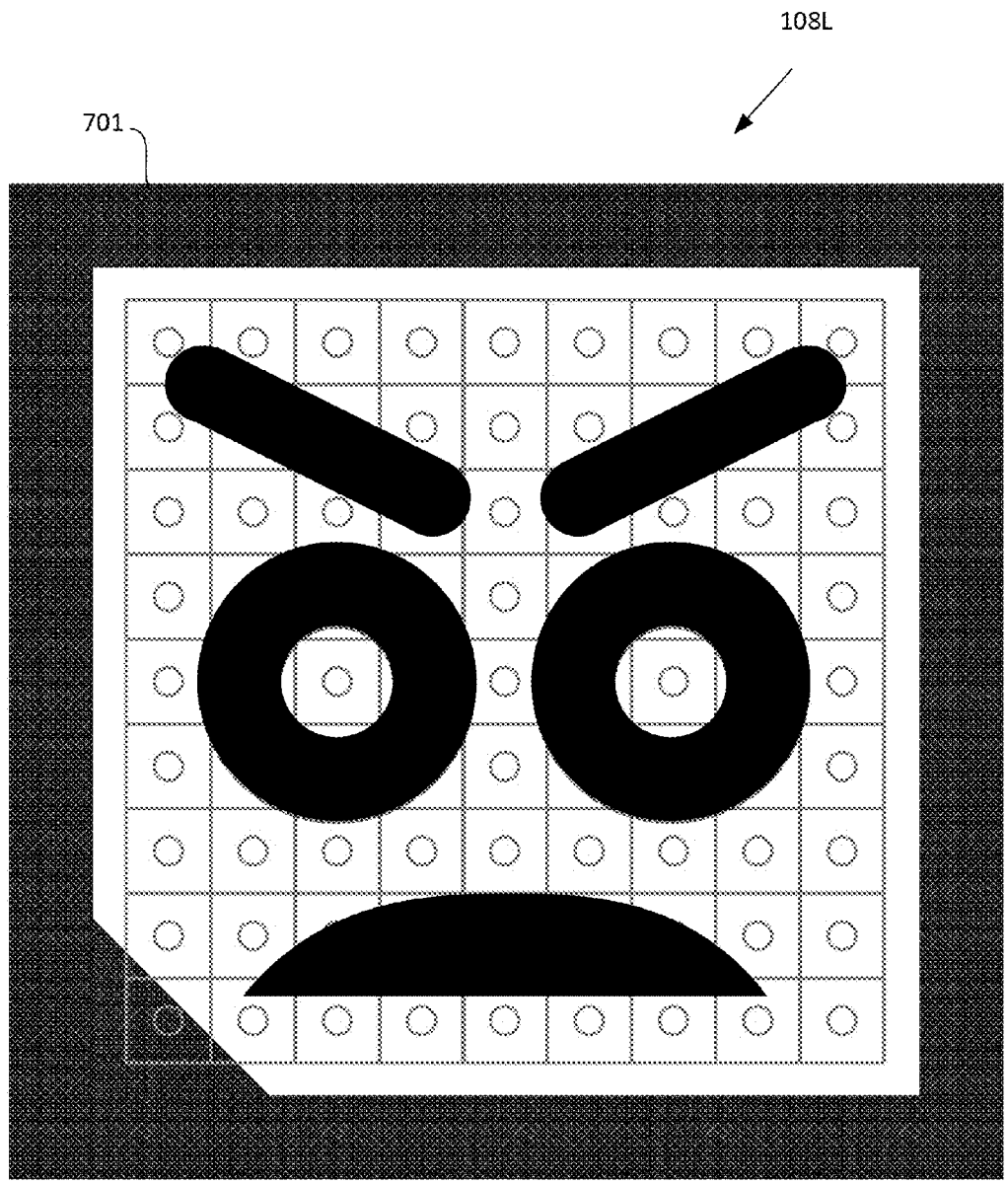

Referring now to FIGS. 7A and 7B, there is shown another illustrative example of two machine-readable optical codes 108K, 108L, containing the same information but different aesthetic appearances, according to one embodiment.

Figure 8A:
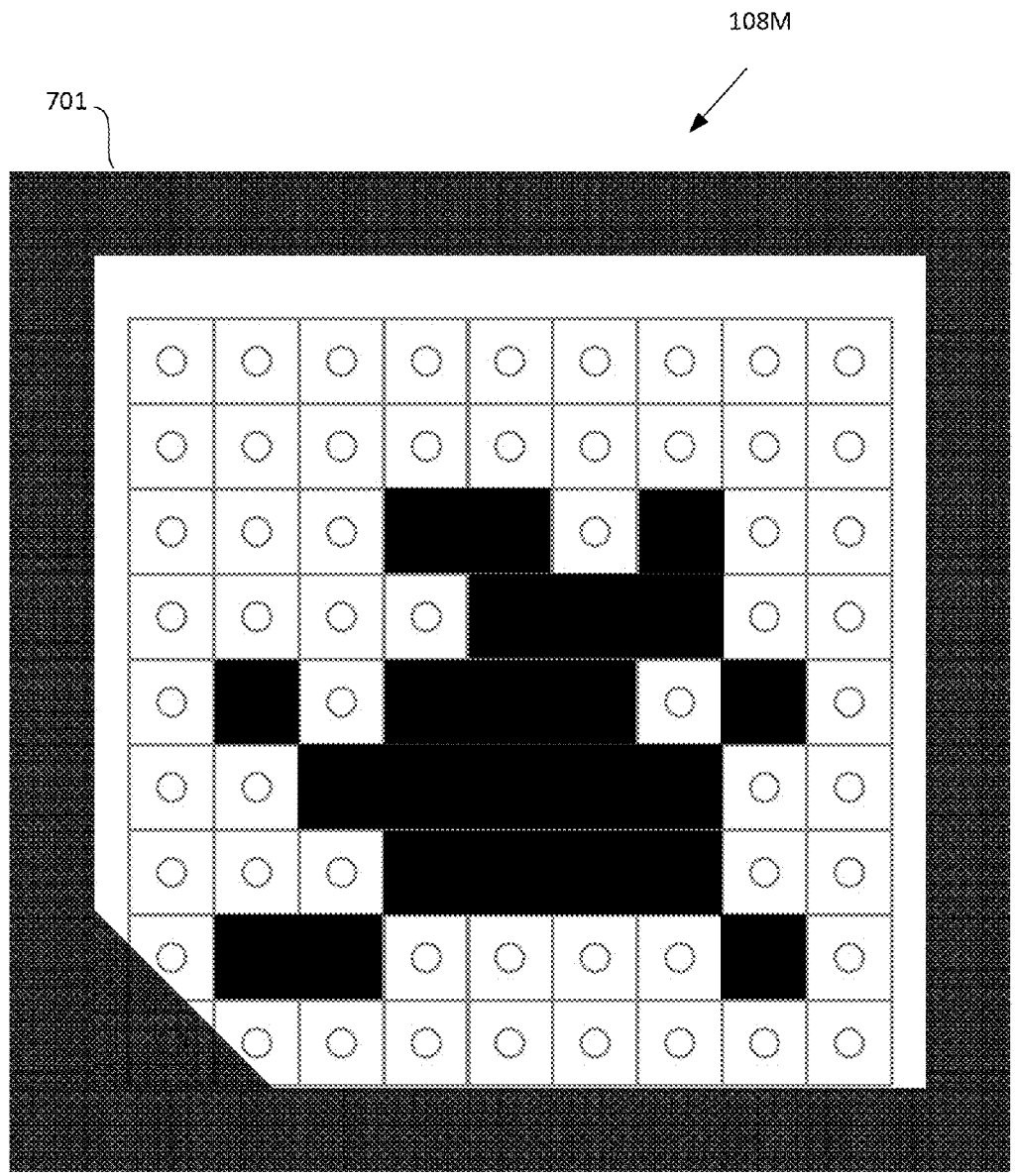
FIGS. 8A and 8B depict another illustrative example of two machine-readable optical codes containing the same information but different aesthetic appearances, according to one embodiment.
Figure 8B:
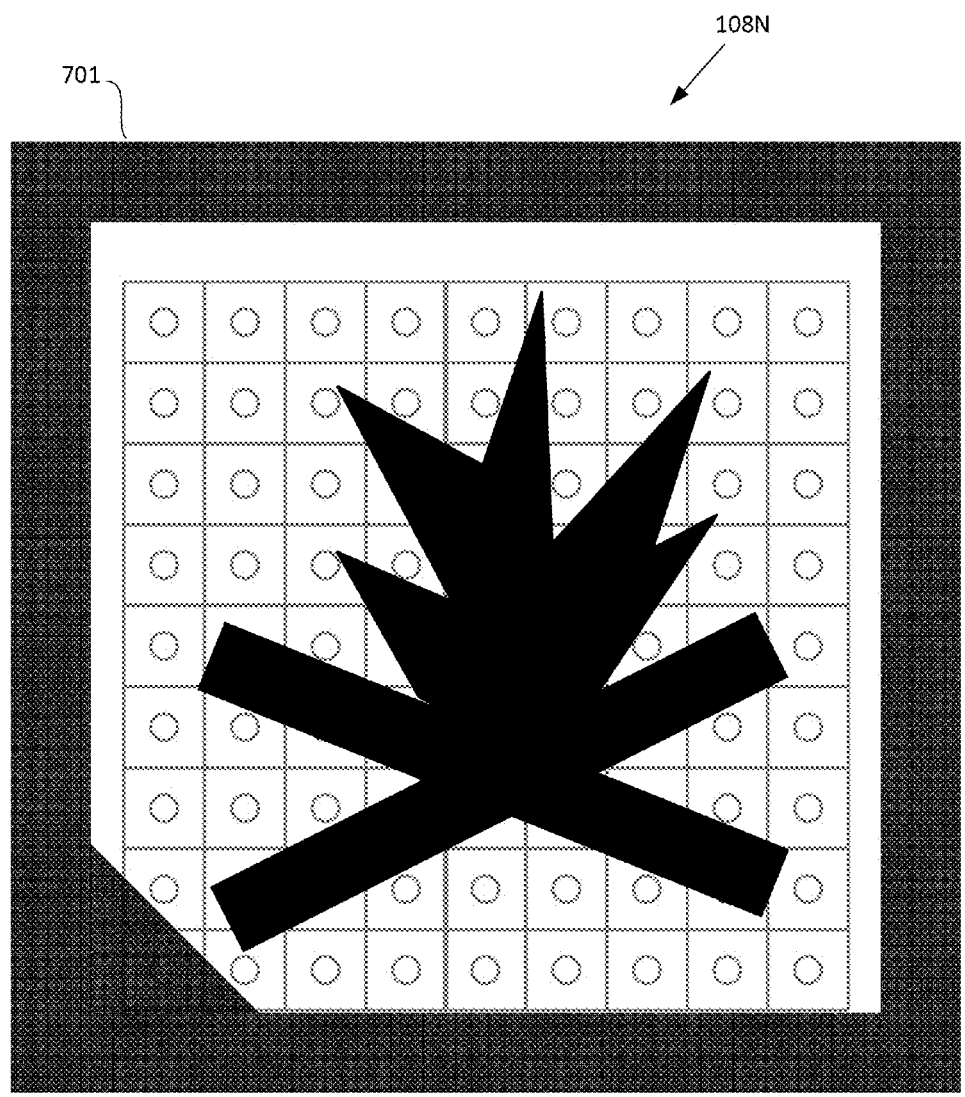

Referring now to FIGS. 8A and 8B, there is shown another illustrative example of two machine-readable optical codes 108M, 108N, containing the same information but different aesthetic appearances, according to one embodiment.

FIGS. 7A through 8B also include fiducial markers 701, also referred to herein as fiducials. As described in more detail below, a fiducial 701 is a known marker used to locate machine-readable optical code 108 at an arbitrary location within a larger image. In these examples, fiducial 701 is a thick black square surrounding code 108, although other forms of fiducial 701 can be used.

Figure 9A:
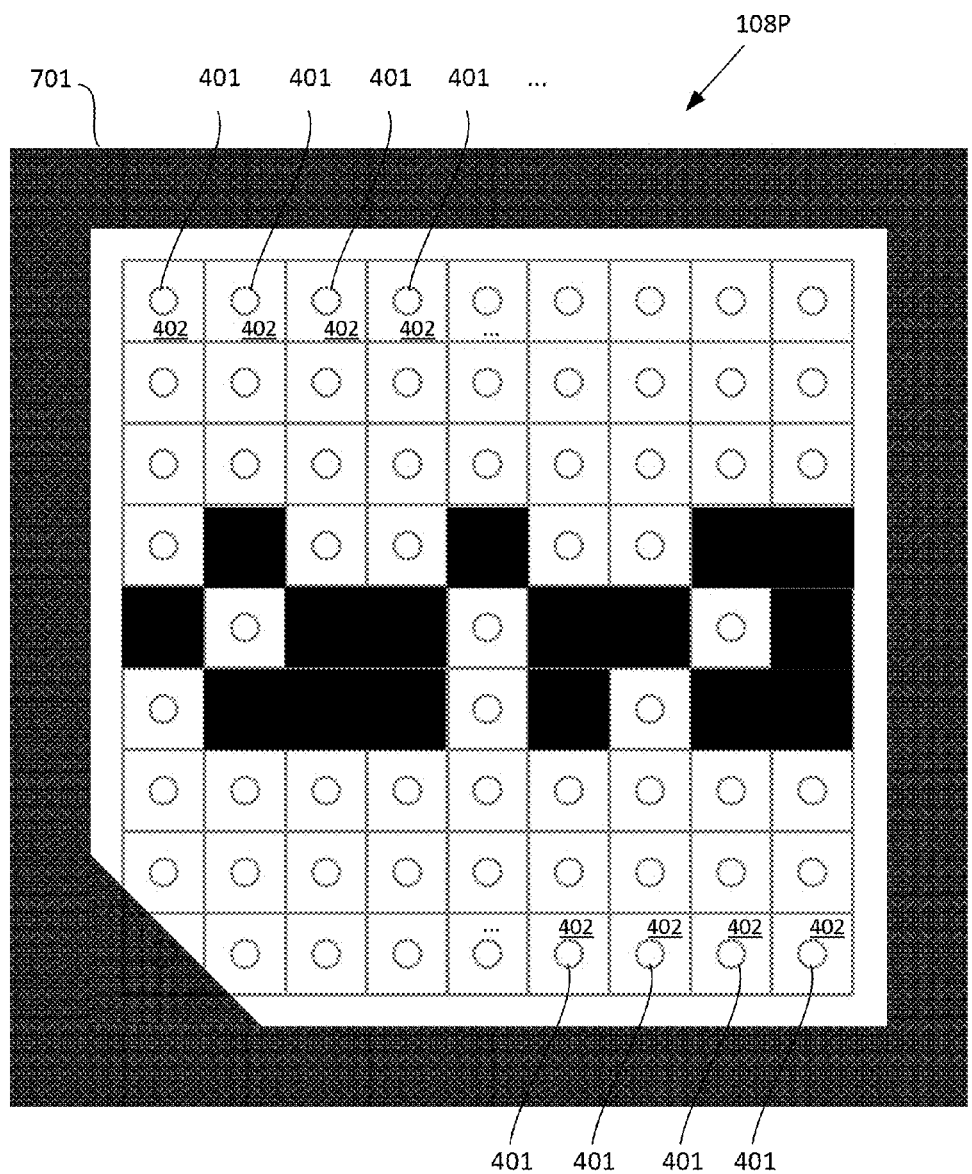
FIGS. 9A and 9B depict another illustrative example of two machine-readable optical codes containing the same information but different aesthetic appearances, wherein the second code presents a corporate logo, according to one embodiment.
Figure 9B:
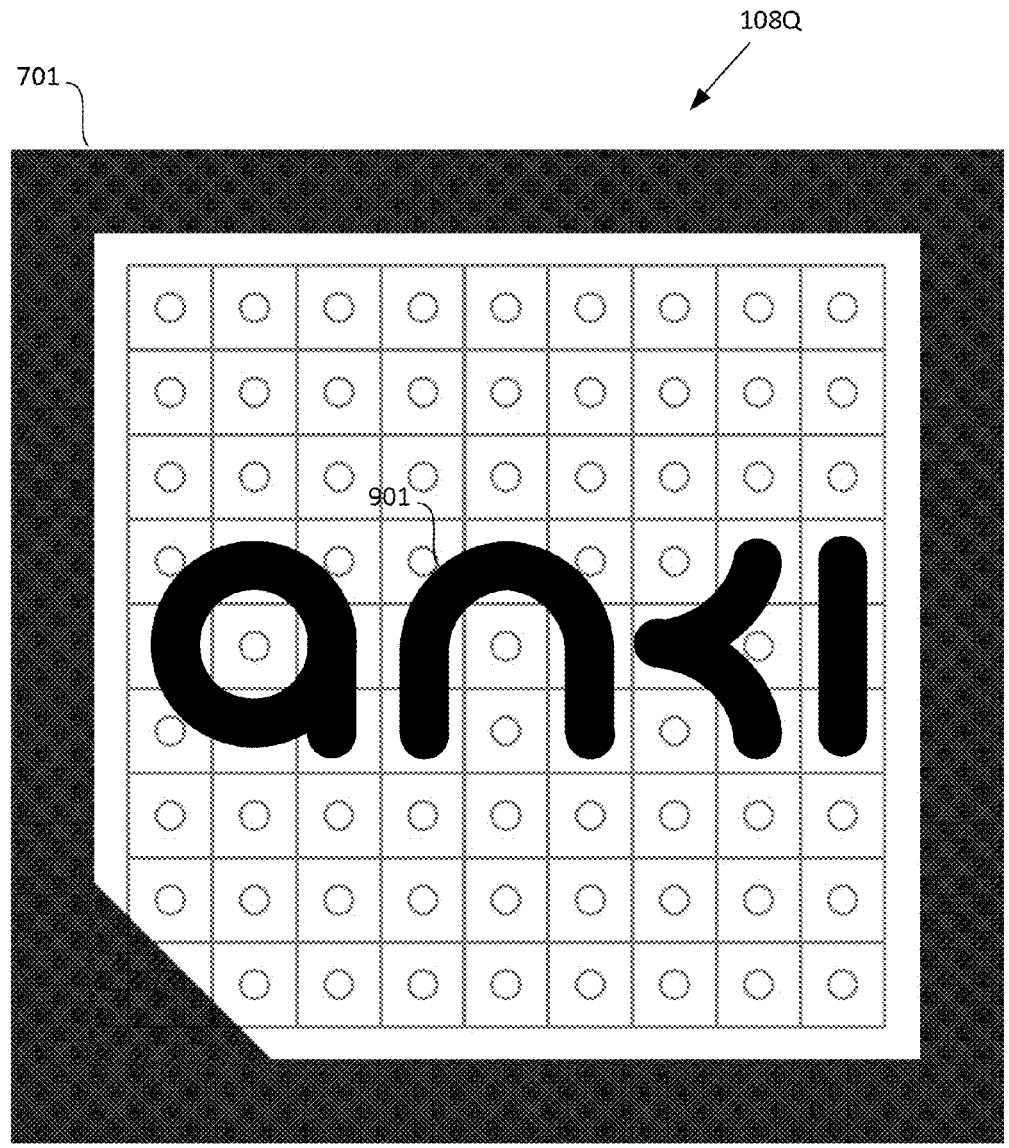
Figure 9C:
FIG. 9C depicts the same machine-readable optical code as shown in FIG. 9B, but without showing probe locations.

Referring now to FIGS. 9A and 9B, there is shown another illustrative example of two machine-readable optical codes 108P, 108Q, containing the same information but different aesthetic appearances, according to one embodiment wherein the machine-readable optical code can be drawn as a corporate logo 901, consisting of stylized text. Again, the positioning of the black and white areas of the logo 901, as superimposed on probe locations 401, ensures that machine-readable optical code 108Q of FIG. 9B carries the same meaning as compared with machine-readable optical code 108P of FIG. 9A. FIG. 9C depicts the same machine-readable optical code 108Q as shown in FIG. 9B, drawn as corporate logo 901, as it would appear to the user (i.e., without cells 3 and probe locations 401).

In various embodiments, the aesthetic design formed by code 108 according to the techniques described herein can be of any suitable type or form, whether graphical, text, or some combination thereof. As mentioned above, it may be representative of the information encoded in code 108, or it may be completely independent of such information. It may serve any aesthetic, marking, and/or informative purpose, and/or any other purpose, or no purpose at all.

Method

Figure 10:
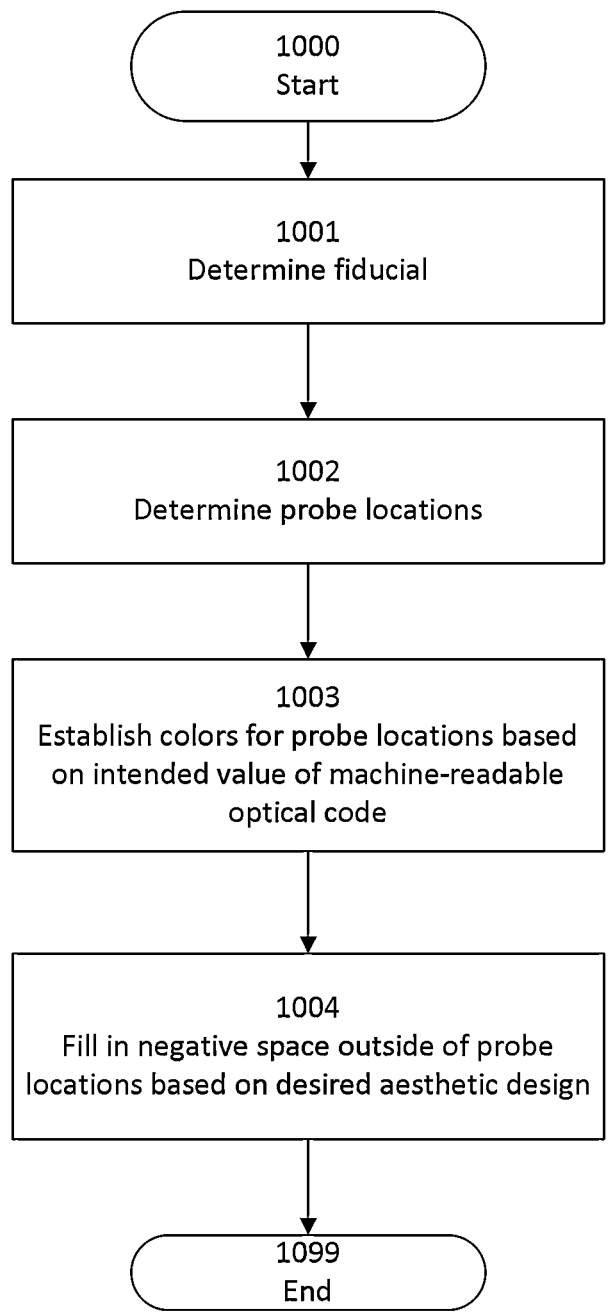
FIG. 10 is a flow diagram depicting an overall method for generating a machine-readable optical code having an aesthetic component, according to one embodiment.

Referring now to FIG. 10, there is shown a flow diagram depicting an overall method for generating a machine-readable optical code 108 having an aesthetic component, according to one embodiment. The method depicted in FIG. 10 can be performed by any suitable computing or hardware device, which may for example have an architecture such as that shown in FIG. 1.

The method begins 1000. First, the system determines 1001 a fiducial 701 for the machine-readable optical code 108. In at least one embodiment, fiducial 701 is a known marker that identifies the bounds of machine-readable optical code 108, an example is the black square as depicted in FIGS. 7A through 9C, although other forms of fiducial 701 can be used.

Based on the determined fiducial 701, the system determines 1002 probe locations 401; these are generally centered within cells 301, though they need not be. In one embodiment, probe locations 401 are of predetermined size based on established tolerances for the code-reading equipment. For example, each probe location 401 should be large enough so as to account for the possibility that the code-reading equipment will read a location slightly off from the center of each cell 301.

Colors are established 1003 for probe locations 401, based on the intended value of the machine-readable optical code 108. Then, negative space outside of probe locations 401 is filled in, based on a desired aesthetic design. The aesthetic design may be generated automatically by a machine, based on specified parameters. Alternatively, the aesthetic design can be specified by a human operator. Alternatively, some combination of these two methods can be used, for example to automatically generate an aesthetic design but allow for a human operator to edit the automatically generated design. Any suitable user interface can be used for allowing a user to generate a design in this manner, including for example an interface that permits a user to draw a shape constrained to the requirements of the intended meaning of the machine-readable optical code.

For example, in at least one embodiment, a user interface can be provided that presents a drawing canvas indicating the allowable drawing area(s) relative to a fiducial (shown or not shown), and a faint indication of where the probe locations are. Any of a number of drawing tools, common to computer programs for graphical design and layout, can be provided via buttons and/or other controls around the canvas. For example, buttons may provide tools for drawing straight and/or curved lines by clicking and dragging with an input device such as a computer mouse. Other buttons may provide basic shapes, such as rectangles and circles, also drawn by clicking and dragging with an input device. In at least one embodiment, the interface can be configured to prevent the user from drawing anything that crosses through any probe location, and instead constrains any drawn line to negative space and any closed, filled shape to completely exclude or include whole probes at a time. Thus, for example, if the user attempts to move lines or edges of shapes to locations within probes, the system can cause the lines or the shapes' edges to snap to the boundaries of the nearest probe locations.

The method then ends 1099.

Figure 11B:
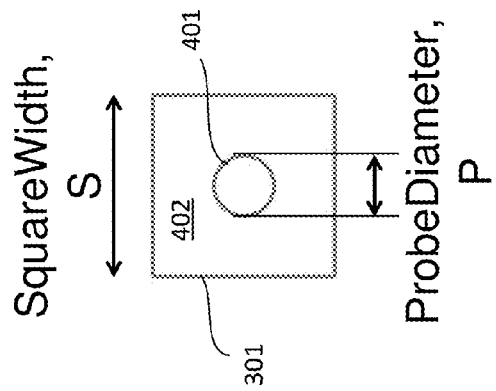
FIG. 11B depicts an illustrative example of a cell in the fiducial of FIG. 11A, including sample dimensions, according to one embodiment.
Figure 11A:
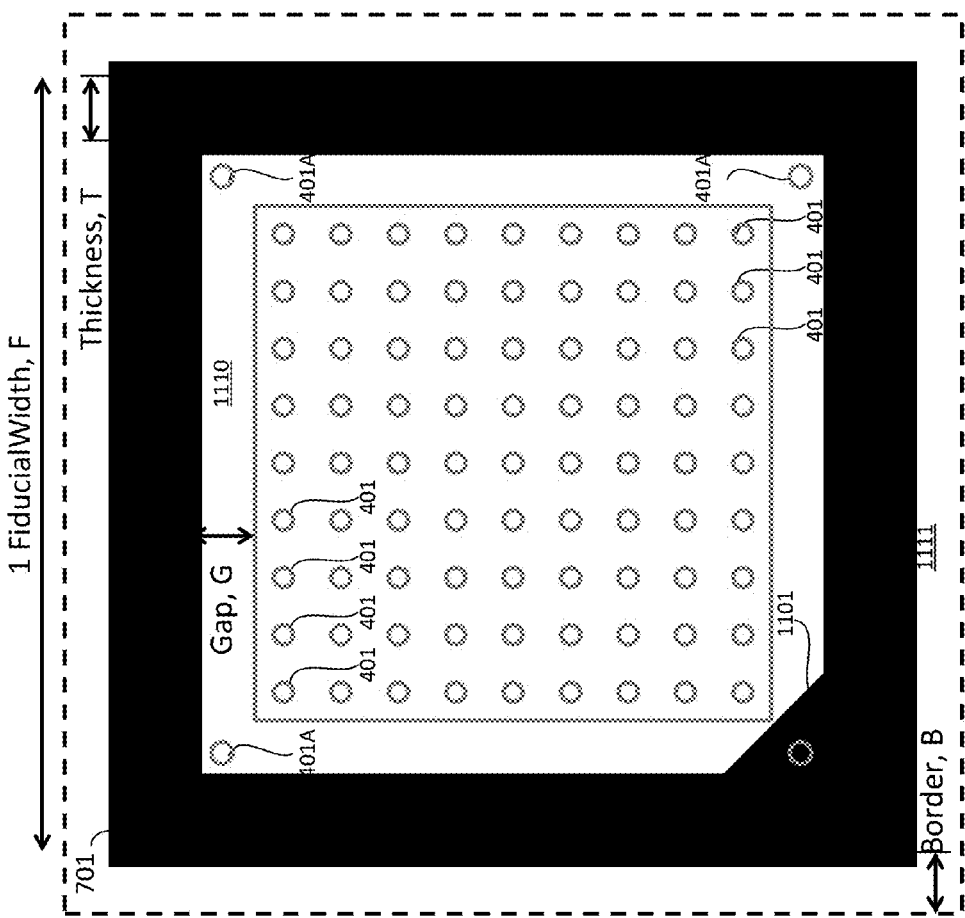
FIG. 11A depicts an illustrative example of a fiducial marker (fiducial), including sample dimensions, for use in generating a machine-readable optical code having an aesthetic component, according to one embodiment

Referring now to FIG. 11A, there is shown an illustrative example of a fiducial marker (fiducial) 701, including sample dimensions, for use in generating a machine-readable optical code 108 having an aesthetic component, according to one embodiment. Here, fiducial 701 is square and has a corner marker 1101, although one skilled in the art will recognize that it can be of any shape, size, or design. Of course, the choice of shape, size, or design can have an impact on ease of detection from arbitrary viewpoint. For example, the use of a substantially square fiducial 701 as shown in FIG. 11A may be advantageous because it lends itself to a computationally inexpensive method for detecting the pattern that is robust despite viewpoint changes. In addition, the sharp corners of such a fiducial 701 can aid in its accurate localization within an image and, optionally, a precise estimate of its position in 3D space, as described below.

In the example of FIG. 11A, F represents the width of fiducial 701, which corresponds to the outside of the thick black square. G represents the gap 1110 between the outside edge of the outermost cells 301 and the inside edge of fiducial 701. B represents the area outside fiducial 701.

Referring now also to FIG. 11B, there is shown an illustrative example of a cell 301 in fiducial 701, including sample dimensions, according to one embodiment. S represents the width of cell 301, also referred to as SquareWidth. P represents the diameter of probe location 401 (ProbeDiameter). Also shown is the area 402 outside probe location 401 but within cell 301.

In at least one embodiment, all dimensions scale to the size of fiducial 701. Thus, once the system identifies the size of fiducial 701, all cells 301 and probe locations 401 can be determined. In addition, fiducial 701 and probe location 401 layouts can be made scalable and parameterized as needed or desired.

In at least one embodiment, dimensions are related as follows:

For a code 108 having an N×N array of cells 301:
Scaling factor a: $0.0 < a \leq 1.0$
$S = F/(N+2+2a)$
$G = B = aS$
$T = S$
$P = S/3$ One skilled in the art will recognize that the above relationships are merely exemplary.

Fiducial Detection Method

Figure 15:
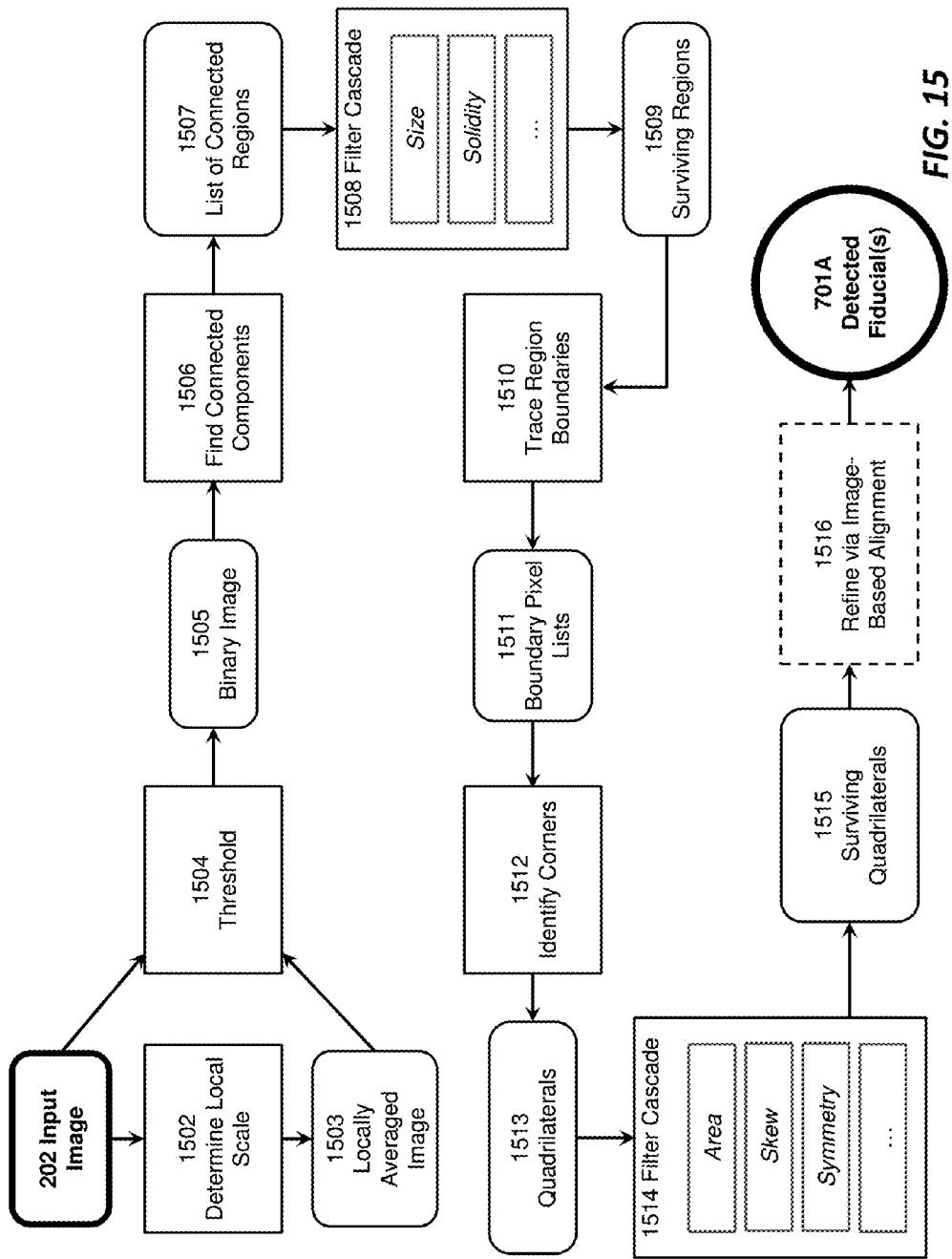
FIG. 15 is a flow diagram depicting a method for detecting fiducials according to one embodiment.

Referring now to FIG. 15, there is shown a flow diagram depicting a method of detecting fiducials 701 according to one embodiment. The goal of this method is to find a known, general fiducial 701A (such as a thick black square) which localizes the machine-readable optical code 108 within an image captured by a camera or optical scanner, regardless of the particular viewpoint of the camera or optical scanner. In some situations, the fiducial detection method depicted in FIG. 15 may be simpler, particularly if a consistent (e.g. fronto-parallel) viewing angle is assured for all readings.

In at least one embodiment, the method depicted in FIG. 15 is performed by a device such as shown in FIG. 2, wherein scanner 201 (or other image capture device) obtains scanned image 202 containing machine-readable optical code(s) 108. Processing steps can be performed, for example, by processor 104 under the direction of software and in connection with other hardware components. In other embodiments, the method depicted in FIG. 15 can be performed by hardware devices having other architectures and components.

In the flow diagram of FIG. 15, rectangles represent operations and rounded rectangles represent intermediate products of those operations.

Input image 202 is captured or scanned, for example by a scanner 201, camera, or other similar device. In at least one embodiment, input image 202 is binarized (turned into a black-and-white image). In at least one embodiment, this binarization provides a mechanism to account for the possibility that some portions of image 202 may be lit more brightly than others. A local scale 1502 is determined for each part of image 202; this locally averaged image 1503 is then compared to a threshold 1504, by comparing each pixel's brightness to the average brightness of a neighborhood of pixels surrounding it, in order to determine if the pixel should be considered on or off. The result is binary image 1505.

In at least one embodiment, the size of the neighborhood using in step 1502 is determined at each pixel by characteristic scale estimation. Characteristic scale estimation uses the density of features in image 202 (such as how many edges/changes are within a given area) to determine the size of the neighborhood to consider. For example, where there is more detail, a smaller neighborhood is used; conversely, where there is less detail, a larger neighborhood is used. In at least one embodiment, characteristic scale estimation is accomplished using a Laplacian Image Pyramid. See, for example, Lindeberg, Scale-Space Theory in Computer Vision, Kluwer Academic Publishers/Springer, Dordrecht, Netherlands, 1994.

In at least one embodiment, the size of gap 1110 around fiducial 701A is chosen to be optimal for characteristic scale estimation, since it separates the inside area that has a large amount of detail (and a smaller neighborhood) from the outside area that has less detail (and a larger neighborhood). Gap 1110 can therefore help make fiducial 701A stand out during the local scale determination process.

Once binary image 1505 has been constructed, the system then finds 1506 components within binary image 1505 that are neighbors to one another in the image's 1505 pixel lattice, either in the 4-connected or 8-connected sense. These connected components represent regions of the same value (e.g. black regions) that are connected to one another.

The result is a list 1507 of connected regions. List 1507 is then filtered 1508 to determine which regions are of sufficient size, solidity, and the like to represent meaningful data. A progressive cascade of filters can be used. For those regions 1509 that survive the filtering process, region boundaries are traced 1510, yielding boundary pixel lists 1511.

Corners of the boundaries are identified 1512, for example by filtering the (x,y) coordinates of the boundaries and looking for peaks in curvature. This yields a set of quadrilaterals 1513 (by removing those shapes that do not have four corners).

The quadrilaterals are filtered 1514 to identify those that have appropriate parameters (such as area, skew, symmetry, and the like, for example to remove those shapes that are very asymmetric, highly skewed, etc.). A progressive cascade of filters can be used. Those quadrilaterals 1515 that survive the filtering process can optionally be refined 1516 using any suitable method of image-based alignment, such as for example optimizing, in a mathematical sense, the sub-pixel location of the four corners of the quadrilateral, by finding the small perturbation of them that best aligns the quadrilateral's edges with strong image gradients. The result is a set of detected fiducials 701A.

In at least one embodiment, determinations of sufficient size, solidity, skew, symmetry, and the like can be made using training data and a machine learning approach.

Decoding Algorithm

Figure 16:
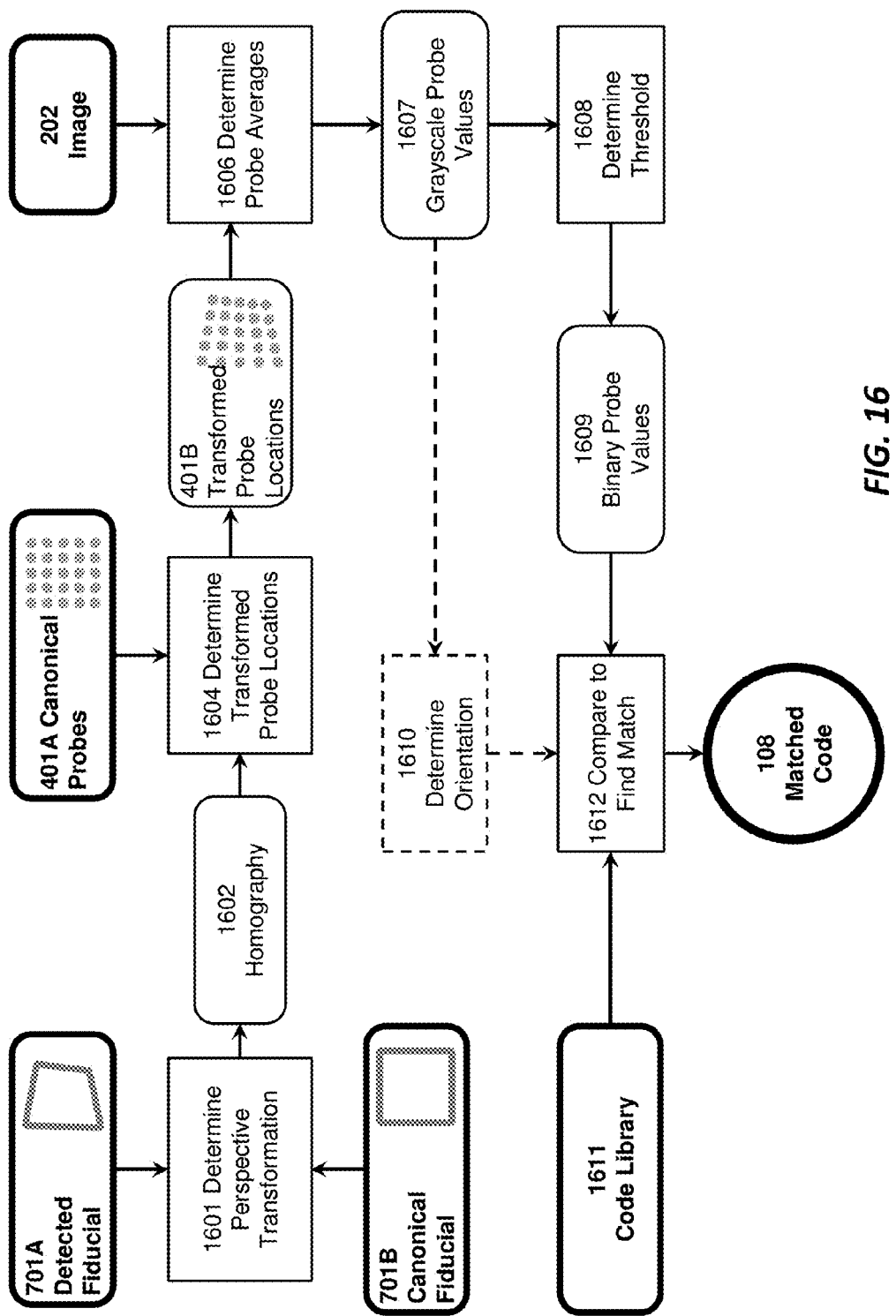
FIG. 16 is a flow diagram depicting a method of decoding a code after a fiducial has been detected, according to one embodiment.
Figure 17:
FIG. 17 depicts examples of conventional machine-readable optical codes, according to the prior art.
Figure 17:
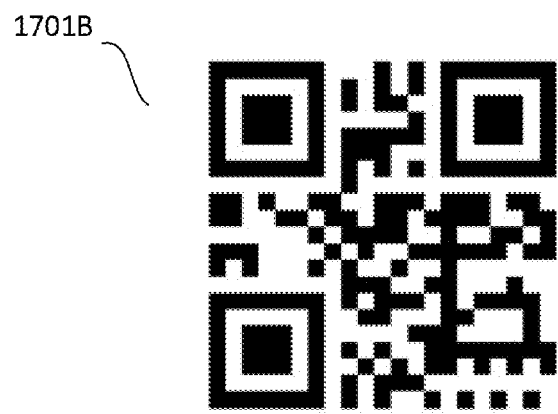
Figure 17:
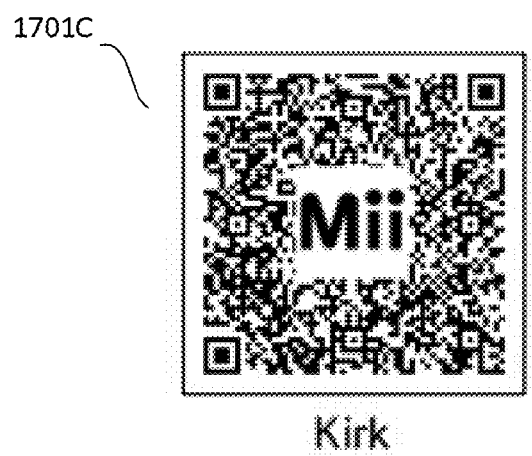

Referring now to FIG. 16, there is shown a flow diagram depicting a method of decoding a code after a fiducial 701A has been detected, according to one embodiment. The goal of this method is to determine the code 108 contained within an already-localized fiducial 701A.

In at least one embodiment, the method depicted in FIG. 16 is performed by a device such as shown in FIG. 2, after scanner 201 (or other image capture device) has obtained scanned image 202 containing machine-readable optical code(s) 108, and after the steps of FIG. 15 have been performed to detect fiducial 701A. Processing steps can be performed, for example, by processor 104 under the direction of software and in connection with other hardware components. In other embodiments, the method depicted in FIG. 16 can be performed by hardware devices having other architectures and components.

In the flow diagram of FIG. 16, rectangles represent operations and rounded rectangles represent intermediate products of those operations.

The system determines 1601 a perspective transformation (if any) that applies to detected fiducial 701A by comparing fiducial 701A with a canonical fiducial 701B (i.e., one that has no perspective transformation applied) to determine the relative positions of the corners of the quadrilateral. The result of this analysis is homography 1602, which is a mathematical specification of the perspective transformation. The system then takes the positions of canonical probe locations 1603 and applies the transformation specified in homography 1602 to determine 1604 transformed (warped) probe locations 401B.

Scanned image 202 is processed to determine 1606 one or more grayscale probe value(s) 1607 at each warped probe location 401B.

In at least one embodiment, the system and method described herein allow for some degree of tolerance in positioning of artwork within machine-readable optical codes 108. For example, if a black area of the artwork slightly impinges on a probe location 401, the probe location 401 should still read as white (and vice versa). Accordingly, in at least one embodiment, tolerance is accomplished by taking readings at several positions (such as eight positions, for example) within probe location 401B, and taking the average value of those readings.

Thresholding 1608 is performed on these averages to determine binary probe values 1609 for the readings. Additional details on determining thresholds and accounting for changes in local lighting conditions are described below. Optionally, special orientation bits and/or corner markers can be used to determine code orientation 1610 and/or the threshold to use.

Final binary probe values are compared 1612 against a code library 1611 (which may be stored in data store 107 or in any other suitable location) to find a matched code 108, which is then output. In various embodiments, matching can be exact or "nearest" (based on some distance metric or trained classifier).

Any suitable mechanism can be provided for performing matching. In at least one embodiment, a distance metric such as the Hamming distance between binary strings can be used.

Alternatively, the set of thresholded probe values can also be interpreted as one long binary array which represents a numerical value or characters. For example, an 8×8 code contains 64 probes, which provides enough bits for a 64-bit integer or floating point value to be represented. Alternatively, the values can be grouped into 8-bit ASCII characters, yielding an 8-character string. Matching can then be performed using the array, numerical value, or characters.

In at least one embodiment, the "trained classifier" learns a mapping from example probe readings to desired labels, specific to the particular application. For example, at training time, the classifier can be trained with all expected probe values (which can include synthetic variations and/or perturbations), paired with a labels that should be output for each of the probe values. Training may also include an "ignore" label for probe values that the system should ignore. The classifier returns the trained label for a set of values measured at run time, or indicates the observed code was part of the "ignore" set.

Variations

Detection of 3D Pose of Code

In at least one embodiment wherein machine-readable optical code 108 is being read by a camera from a real-world object or surface, the system can determine the three-dimensional pose (including position and orientation) of the camera with respect to the object or surface, using well-known techniques. This allows the system to determine the position of a real-world object of interest on which the code is affixed, assuming the code's location on that object is known. This is useful, for example, in robotic applications where a robot is configured to interact with the object on which the code is affixed, for example by manipulating it directly or planning a path around it as an obstacle.

Border and Gap

In at least one embodiment, code reading can be made more robust by providing a gap 1110 inside and/or outside fiducial 701, as shown in the example of FIG. 11A. B represents a border 1111 that lies outside fiducial 701, and can serve to separate one code 108 from another. G represents a gap area 1110 inside fiducial 701, but outside probe locations 401. The gap 1110 and/or border 1111 may make it easier for scanner 201, processor 104, or other components to identify the location of fiducial 701, especially, for example, when using a characteristic-scale-based method to determine local thresholds.

Orientation Markers

In at least one embodiment, an orientation-specific modification to the fiducial (such as a corner marker 1101) is provided, as shown in the bottom left corner of FIG. 11A. Corner markers 1101 provide scanner 201, processor 104, or other components with an intended orientation of code 108, and allow code 108 to be scanned at any orientation without ambiguity. However, such a feature is optional; in an alternative embodiment, scanner 201, processor 104, or other components can attempt to interpret code 108 in all four orientations, and determine based on such interpretations which orientation makes sense; alternatively, such components may use other disambiguation techniques to ascertain the intended orientation. In at least one embodiment, fiducial 701 is designed to cover certain corner probe locations 401, so that no additional probe locations 401 are required for orientation determination. In other embodiments, additional probes in known locations 401A within the fiducial or gap regions, for example, may be used (such as probe locations 401A depicted in FIG. 11A).

Figure 12A:
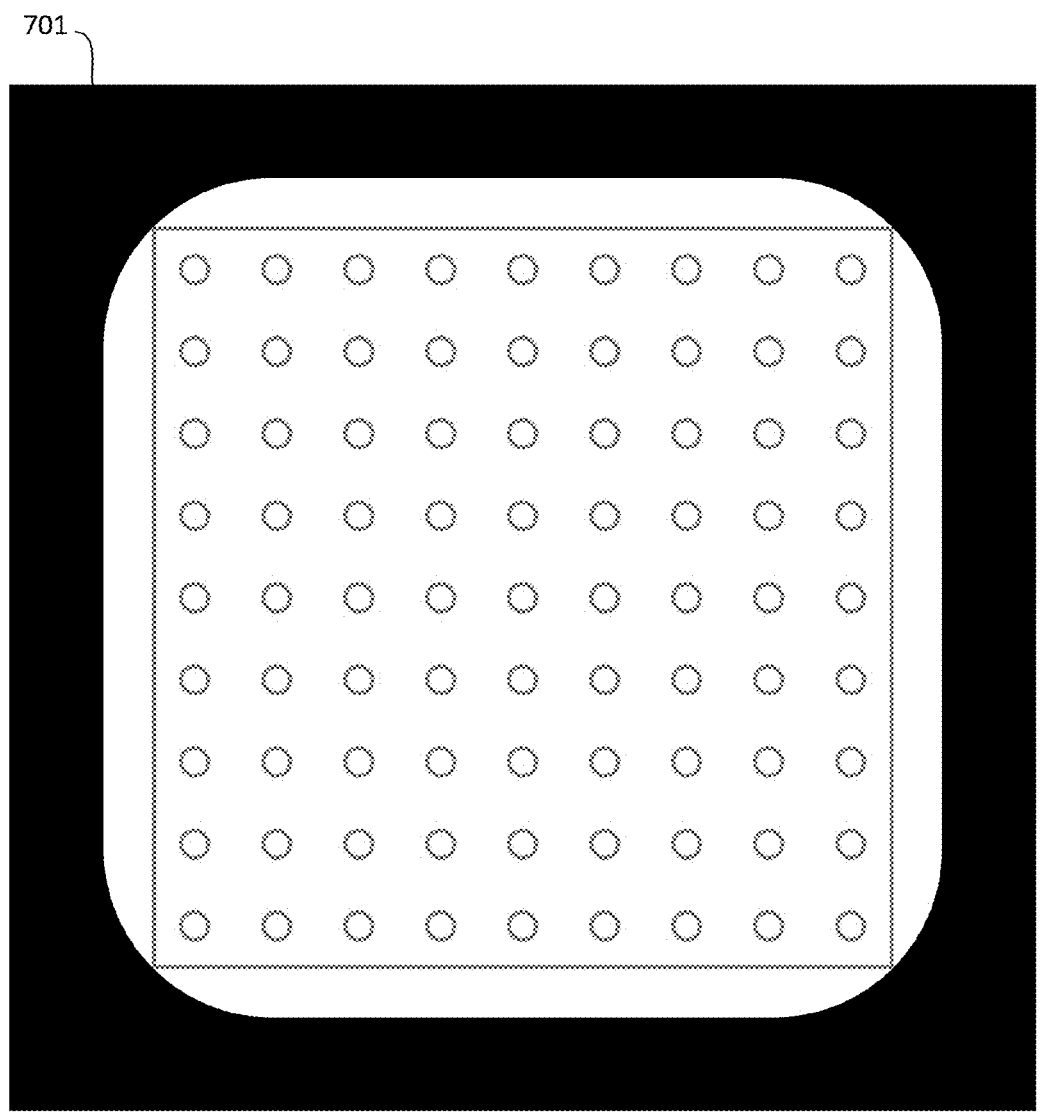
FIGS. 12A, 12B, and 12C depict alternative illustrative examples of fiducials, according to various embodiments.
Figure 12B:
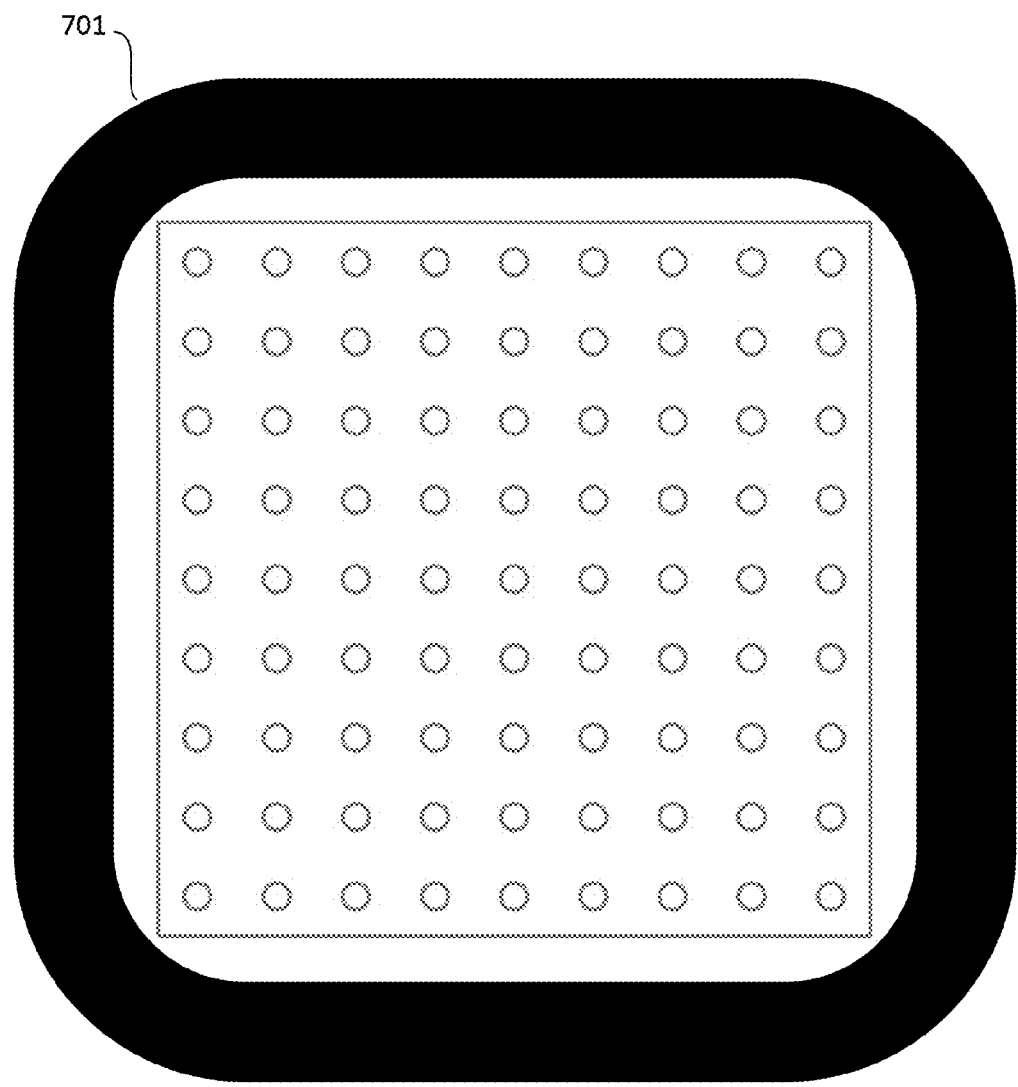
Figure 12C:
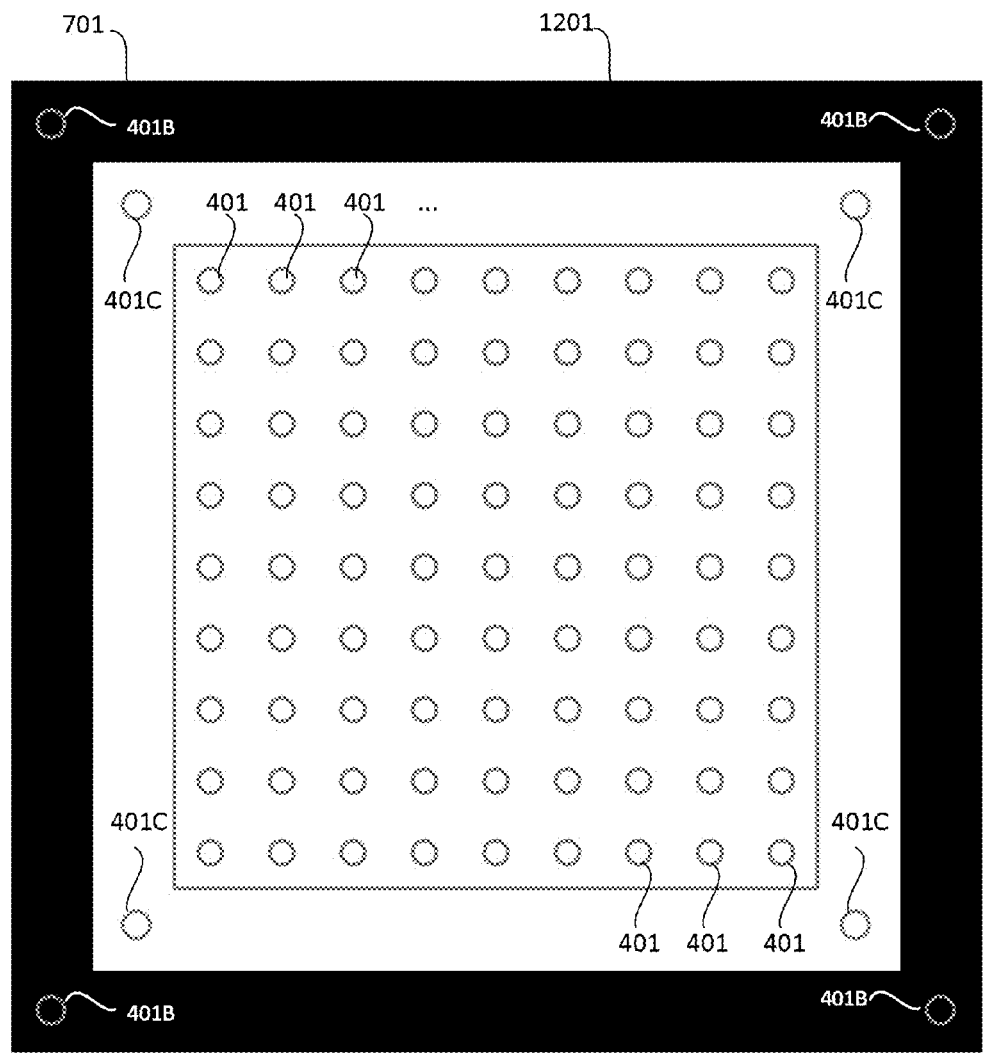

Referring now to FIGS. 12A, 12B, and 12C, there are shown alternative illustrative examples of fiducials 701, according to various embodiments. FIG. 9A depicts an example of a fiducial 701 with curved interior. FIG. 9B depicts an example of a fiducial 701 with curved interior and exterior. These fiducials have no indicators of orientation.

In at least one embodiment, a simple square (or other shape) is used. An example of such a fiducial 701 shown in FIG. 12C. As shown in this example, additional probe locations 401 can be positioned within fiducial square 1201

(probe locations 401B), and/or within gap region 1110 (probe locations 401C). Since fiducial square 1201 is known to be black and gap 1110 is known to be white, such an arrangement of probe locations 401 can be used to help determine appropriate levels for thresholding (i.e. to determine which levels of brightness should be interpreted as black and which should be interpreted as white).

In at least one embodiment, different orientations of the same code 108 can be interpreted as having different meaning. In essence, the same code 108, rotated in different ways, can be used to encode different information (assuming, of course, that the design of code 108 itself is not rotationally symmetric).

Figure 13:
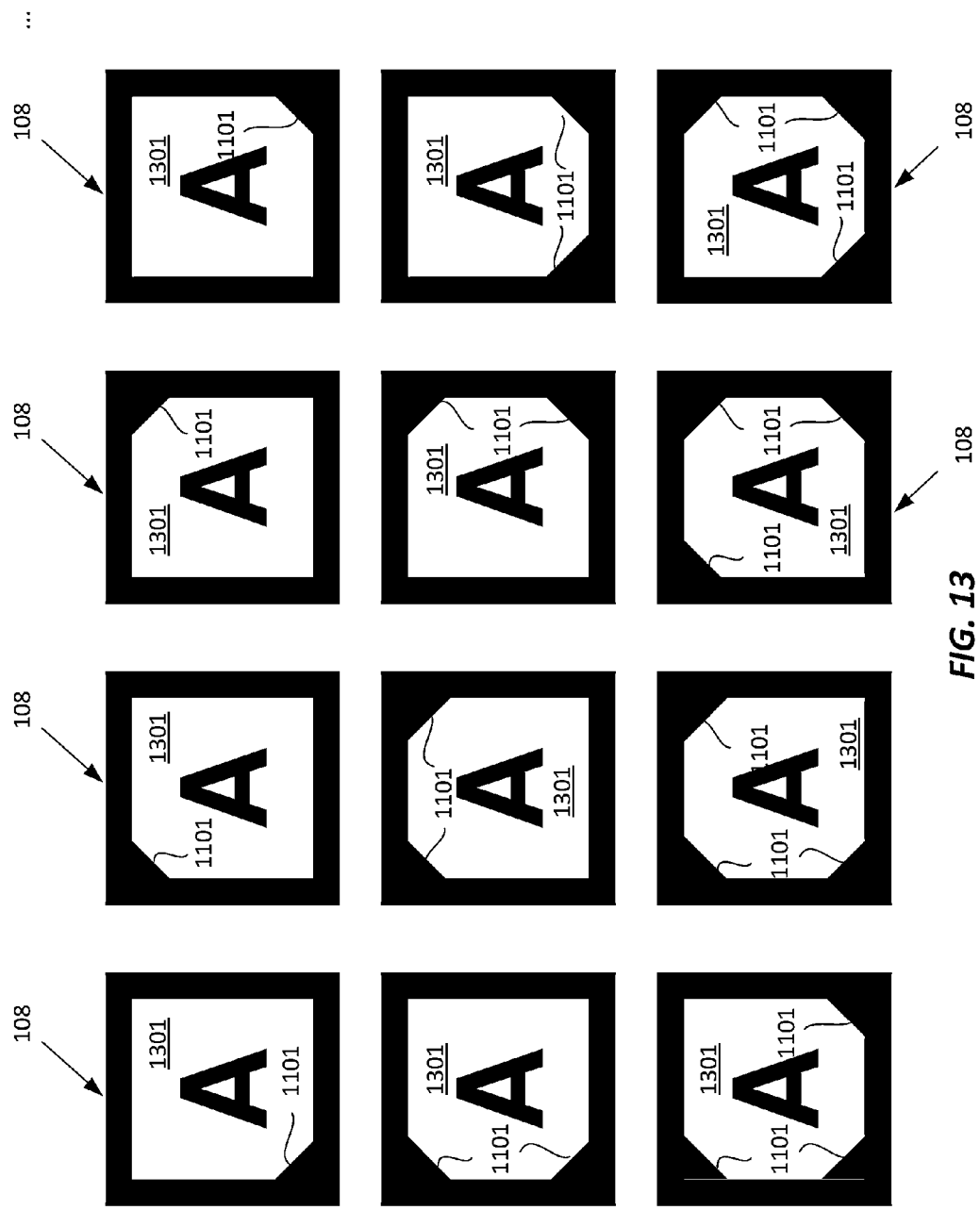
FIG. 13 depicts an illustrative example of the use of orientation indicators to differentiate the same pattern into different markers, according to one embodiment.

Referring now to FIG. 13, there is shown illustrative example depicting the use of orientation indicators (corner markers 1101) to differentiate the same pattern 1301 into twelve different markers, potentially having twelve different meanings, according to one embodiment. In this example, the following convention is used to establish orientation:

1 Corner Indicator: Bottom Left
2 Corner Indicators: Bottom Side
3 Corner Indicators: Bottom+Left Sides One skilled in the art will recognize that many different variations and conventions are possible, and that the codes 108 and patterns 1301 depicted in FIG. 13 are merely exemplary.

Fiducials with Curved Corners

In at least one embodiment, the described system is able to estimate corner locations implied by a fiducial 701, even when such fiducial 701 does not include the corners themselves, or has curved corners. These implied (virtual) corners can be used in exactly the same way as described above for actual corners. The virtual corners are determined based on the straight portions of the sides of the fiducial 701, as described below.

Figure 18:
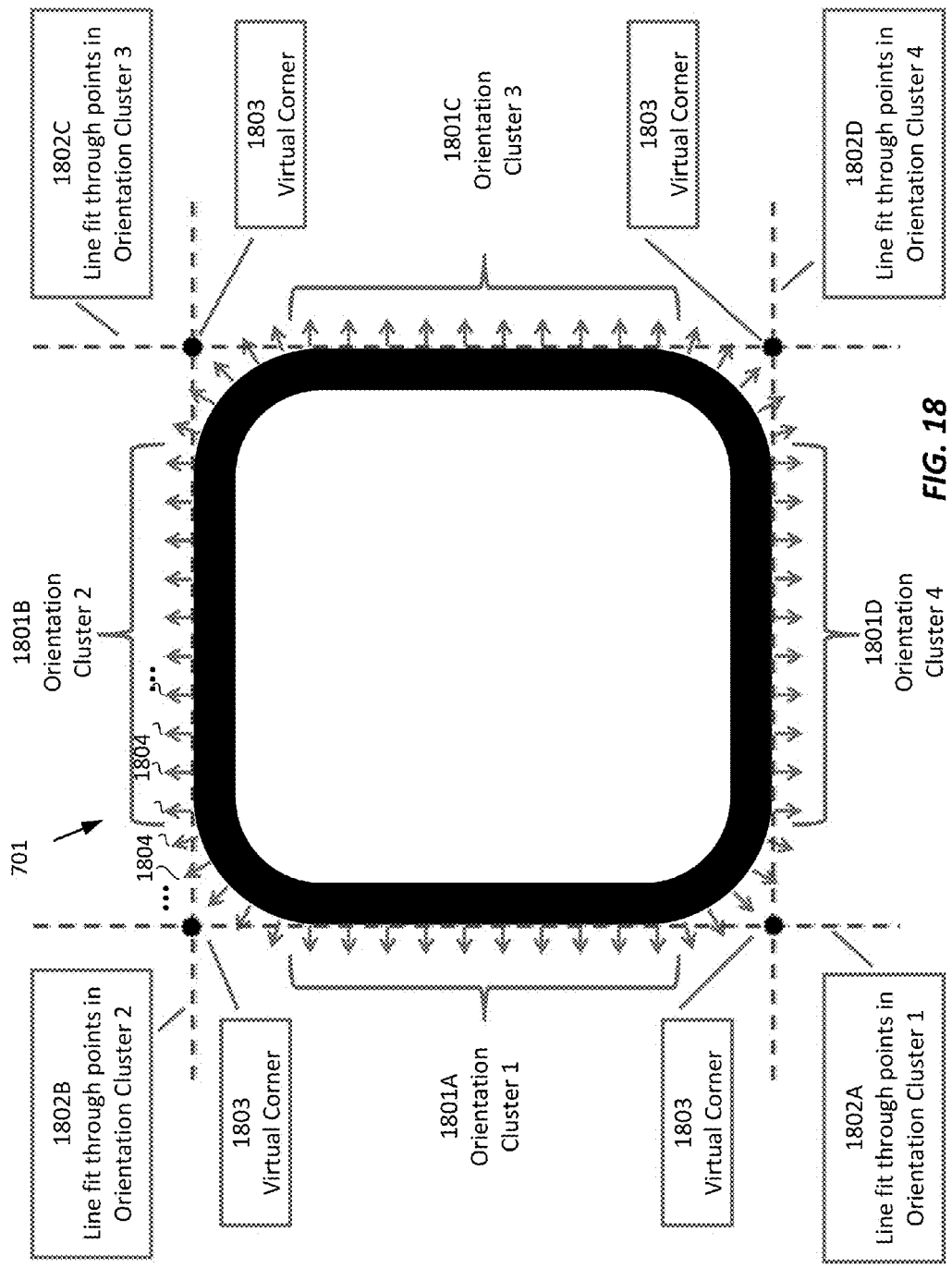
FIG. 18 depicts an example of estimation of virtual corners in a fiducial having curved corners.

Referring now to FIG. 18, there is shown an example of estimation of virtual corners in a fiducial 701 having curved corners. A normal orientation 1804 is determined at each point along the boundary of the shape that defines fiducial 701. These normal orientations 1804 are clustered, with each cluster 1801 representing a set of similar orientations 1804. For a quadrilateral-shaped fiducial 701, four clusters 1801 are defined, each corresponding to one of the sides of the quadrilateral; for example, for the square shape shown in FIG. 18, four clusters 1801A, 1801B, 1801C, 1801D are defined. A line 1802 is fit to the points belonging to each of the four clusters 1801; yielding four lines 1802. For example, in FIG. 18, four lines 1802A, 1802B, 1802C, 1802D are generated, corresponding to clusters 1801A, 1801B, 1801C, 1801D, respectively. The intersections of these four lines 1802 are defined as virtual corners 1803 of fiducial 701.

Although the above-described technique is illustrated in terms of a simple square shape, one skilled in the art will recognize that the same method can be used for other shapes as well, such as for example a skewed quadrilateral having curved corners.

Recursive Probe Encoding

In at least one embodiment, the system uses a technique of recursive probe encoding, wherein a subset of probe locations 401 is used to indicate the remaining probe pattern. In other words, a specified portion of code 108 is read and interpreted, and gives guidance as to how the remaining portion of code 108 should be interpreted.

Figure 14:
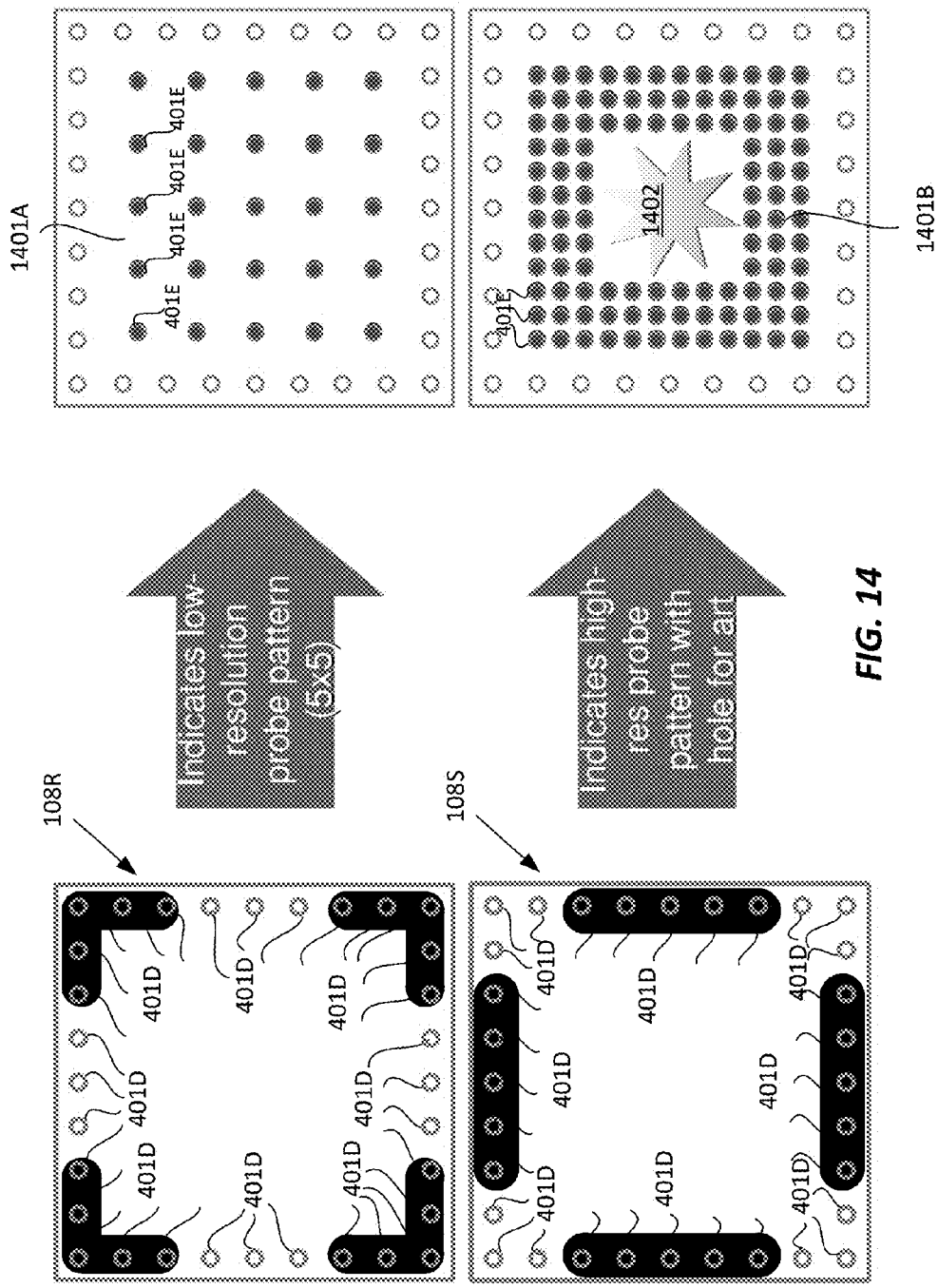
FIG. 14 depicts an illustrative example wherein a pattern detected at certain fixed probe locations indicates how the remainder of the code should be read, according to one embodiment.

For example, as shown in FIG. 14, a set of fixed probe locations 401D is read first (in this example, fixed probe locations 401D include those probe locations 401 that are along the outer edge of code 108R or 108S). The pattern detected at those fixed probe locations 401D indicates how the remainder of code 108R, 108S should be read (including, for example, a specified probe location pattern, resolution, "blank" areas devoted to artwork, and/or the like). In the example, code 108R contains a pattern of fixed probe locations 401D that indicates a low resolution 5×5 probe pattern 1401A of probe locations 401E for the central portion of code 108R. On the other hand, code 108S contains a pattern of fixed probe locations 401D that indicates a higher resolution probe pattern 1401B of probe locations 401E for the central portion of code 108S, with a designated space 1402 in the center that contains no machine-readable data but is reserved for artwork. Other arrangements are possible, wherein some probe locations 401D are fixed, and others are variable, and wherein the fixed probe locations 401D provide indications as to the arrangement of variable probe locations 401. The particular patterns of fixed probe locations 401D shown in FIG. 14 are merely exemplary.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for generating a machine-readable optical code having an aesthetic component, comprising:
    at a processor of a hardware device, determining a fiducial;
    at the processor, determining locations for a plurality of cells within the fiducial;
    at the processor, determining a probe location within each determined cell, wherein at least one of the probe locations is smaller than its corresponding cell;
    at the processor, establishing a machine-readable color for each determined probe location, based on data to be encoded in the machine-readable optical code;
    at the processor, based on a desired aesthetic design, establishing a color pattern for areas within the fiducial but not within probe locations, wherein the color pattern is consistent with the established machine-readable color for each determined probe location;
    at the processor, generating a machine-readable optical code within the determined fiducial using the established color pattern, wherein the machine-readable optical code contains the established machine-readable color at each probe location to encode the data; and
    at an output device, outputting the generated machine-readable optical code.

2. The computer-implemented method of claim 1, wherein each probe location is smaller than its corresponding cell.

3. The computer-implemented method of claim 1, wherein the aesthetic design of the generated machine-readable optical code is representative of a piece of artwork that is different from the data encoded in the machine-readable optical code.

4. The computer-implemented method of claim 1, wherein the aesthetic design of the generated machine-readable optical code comprises human-readable text that is different from the data encoded in the machine-readable optical code.

5. The computer-implemented method of claim 1, wherein generating a machine-readable optical code within the determined fiducial comprises generating a machine-readable optical code comprising an orientation marker to establish correct orientation of the code.

6. The computer-implemented method of claim 5, wherein the orientation marker comprises a corner marker.

7. The computer-implemented method of claim 5, wherein the same machine-readable optical code has different meanings depending on its orientation.

8. The computer-implemented method of claim 1, wherein generating a machine-readable optical code comprises generating a machine-readable optical code wherein at least a subset of the probe locations encode data specifying positions for the remainder of the probe locations.

9. The computer-implemented method of claim 1, wherein generating a machine-readable optical code comprises generating a machine-readable optical code wherein at least a subset of the probe locations encode data specifying positions for the remainder of the probe locations.

10. A computer-implemented method for decoding a machine-readable optical code contained in a detected fiducial, comprising:
- at an image capture device, capturing an input image;
- at a processor, detecting a fiducial within the input image, the fiducial comprising a machine-readable optical code;
- at the processor, obtaining a canonical fiducial containing canonical probe locations;
- at the processor, determining a perspective transformation of the detected fiducial as compared with the canonical fiducial;
- at the processor, applying the perspective transformation to the canonical probe locations to obtain transformed probe locations;
- at the processor, determining at least one probe value for each transformed probe location;
- at the processor, determining binary probe values from the determined probe values;
- at the processor, comparing the determined binary probe values with a code library to identify a matched code; and
- at an output device, outputting the matched code.

11. The computer-implemented method of claim 10, wherein determining at least one probe value for each transformed probe location comprises, for each transformed probe location:
- determining a plurality of probe values; and
- averaging the probe values.

12. The computer-implemented method of claim 10, wherein comparing the determined binary probe values with a code library to identify a matched code comprises determining an orientation based on at least one orientation marker.

13. A system for generating a machine-readable optical code having an aesthetic component, comprising:
- a hardware processor, configured to perform the steps of:
  - determining a fiducial;
  - determining locations for a plurality of cells within the fiducial;
  - determining a probe location within each determined cell, wherein at least one of the probe locations is smaller than its corresponding cell;
  - establishing a machine-readable color for each determined probe location, based on data to be encoded in the machine-readable optical code;
  - based on a desired aesthetic design, establishing a color pattern for areas within the fiducial but not within probe locations, wherein the color pattern is consistent with the established machine-readable color for each determined probe location; and
  - generating a machine-readable optical code within the determined fiducial using the established color pattern, wherein the machine-readable optical code contains the established machine-readable color at each probe location to encode the data; and
- an output device, communicatively coupled to the hardware processor, configured to output the generated machine-readable optical code.

14. The system of claim 13, wherein each probe location is smaller than its corresponding cell.

15. The system of claim 13, wherein the aesthetic design of the generated machine-readable optical code is representative of a piece of artwork that is different from the data encoded in the machine-readable optical code.

16. The system of claim 13, wherein the aesthetic design of the generated machine-readable optical code comprises human-readable text that is different from the data encoded in the machine-readable optical code.

17. The system of claim 13, wherein the hardware processor generating the machine-readable optical code within the determined fiducial comprises generating a machine-readable optical code comprising an orientation marker to establish correct orientation of the code.

18. The system of claim 17, wherein the orientation marker comprises a corner marker.

19. The system of claim 17, wherein the same machine-readable optical code has different meanings depending on its orientation.

20. The system of claim 13, wherein the hardware processor generating a machine-readable optical code comprises generating a machine-readable optical code wherein at least a subset of the probe locations encode data specifying positions for the remainder of the probe locations.

21. The system of claim 13, wherein the hardware processor generating a machine-readable optical code comprises generating a machine-readable optical code wherein at least a subset of the probe locations encode data specifying positions for the remainder of the probe locations.

22. A non-transitory computer-readable medium for generating a machine-readable optical code having an aesthetic component, comprising instructions stored thereon, that when executed on a processor, perform the steps of:
- determining a fiducial;
- determining locations for a plurality of cells within the fiducial;
- determining a probe location within each determined cell, wherein at least one of the probe locations is smaller than its corresponding cell;
- establishing a machine-readable color for each determined probe location, based on data to be encoded in the machine-readable optical code;
- based on a desired aesthetic design, establishing a color pattern for areas within the fiducial but not within probe locations, wherein the color pattern is consistent with the established machine-readable color for each determined probe location;
- generating a machine-readable optical code within the determined fiducial using the established color pattern, wherein the machine-readable optical code contains the established machine-readable color at each probe location to encode the data; and
- causing an output device to output the generated machine-readable optical code.

23. The non-transitory computer-readable medium of claim 22, wherein each probe location is smaller than its corresponding cell.

24. The non-transitory computer-readable medium of claim 22, wherein the aesthetic design of the generated machine-readable optical code is representative of a piece of artwork that is different from the data encoded in the machine-readable optical code.

25. The non-transitory computer-readable medium of claim 22, wherein the aesthetic design of the generated machine-readable optical code comprises human-readable text that is different from the data encoded in the machine-readable optical code.

26. The non-transitory computer-readable medium of claim 22, wherein generating a machine-readable optical code within the determined fiducial comprises generating a machine-readable optical code comprising an orientation marker to establish correct orientation of the code.

27. The non-transitory computer-readable medium of claim 26, wherein the orientation marker comprises a corner marker.

28. The non-transitory computer-readable medium of claim 26, wherein the same machine-readable optical code has different meanings depending on its orientation.

29. The non-transitory computer-readable medium of claim 22, wherein generating a machine-readable optical code comprises generating a machine-readable optical code wherein at least a subset of the probe locations encode data specifying positions for the remainder of the probe locations.

30. The non-transitory computer-readable medium of claim 22, wherein generating a machine-readable optical code comprises generating a machine-readable optical code wherein at least a subset of the probe locations encode data specifying positions for the remainder of the probe locations.

* * * * *